United States Patent [19]

Eickmann

[11] 4,358,073
[45] Nov. 9, 1982

[54] FLUID MOTOR WITH MOVEABLE MEMBERS WORKABLE INDEPENDENTLY OF ITS DRIVE MEANS

[76] Inventor: Karl Eickmann, 2420 Isshiki, Hayama-machi, Kanagawa-ken, Japan

[21] Appl. No.: 954,555

[22] Filed: Oct. 25, 1978

Related U.S. Application Data

[60] Continuation-in-part of Ser. No. 800,756, May 26, 1977, abandoned, and a continuation-in-part of Ser. No. 610,871, Sep. 8, 1975, abandoned, which is a division of Ser. No. 416,237, Nov. 15, 1973, abandoned, which is a division of Ser. No. 131,782, Apr. 6, 1971, Pat. No. 3,790,105, said Ser. No. 800,756, is a continuation-in-part of Ser. No. 465,413, Apr. 30, 1974, abandoned.

[51] Int. Cl.³ .................. B64C 15/00; B64C 29/00
[52] U.S. Cl. .................................. 244/12.1; 244/60
[58] Field of Search ............. 244/12.1, 60, 17.23, 244/DIG. 3, 53 R

[56] References Cited

U.S. PATENT DOCUMENTS

| | | | |
|---|---|---|---|
| 3,254,489 | 6/1966 | Eickmann | 244/DIG. 3 |
| 3,285,190 | 11/1966 | Eickmann | 244/DIG. 3 |
| 3,405,890 | 10/1968 | Eickmann | 244/DIG. 3 |
| 3,497,162 | 2/1970 | Eickmann | 244/DIG. 3 |
| 3,977,302 | 8/1976 | Eickmann | 244/17.23 X |

Primary Examiner—Douglas C. Butler

[57] ABSTRACT

A fluid motor has working chambers which take in and expell a fluid. The fluid under pressure acts in working chambers to produce a torque and thereby to drive the motor, constituting with the associated parts the drive of the motor.

At least one separated fluid line supplies fluid into a space which includes or operates an additional member provided on the fluid motor. The mentioned fluid line and space are able to operate independently of the drive system of the motor.

It is thereby possible to operate over the fluid line, for example by remote control, the additional member on the motor independently of the fluid flow of the drive of the motor. The additional member is thereby able to do an additional work or function independently of the drive of the motor.

In other embodiments of the invention, the additional member may work in unison or dependence on the fluid drive of the motor, when so desired. Instead of applying only a single separated fluid line a number of separated fluid lines can also be applied and may provide different actions of one or more additional members on the fluid motor.

5 Claims, 44 Drawing Figures

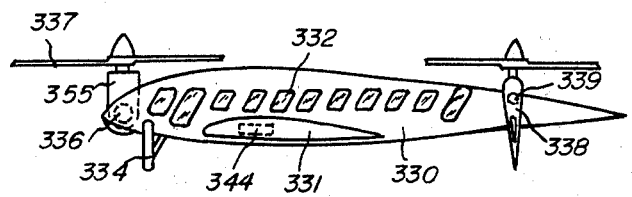
Fig.20
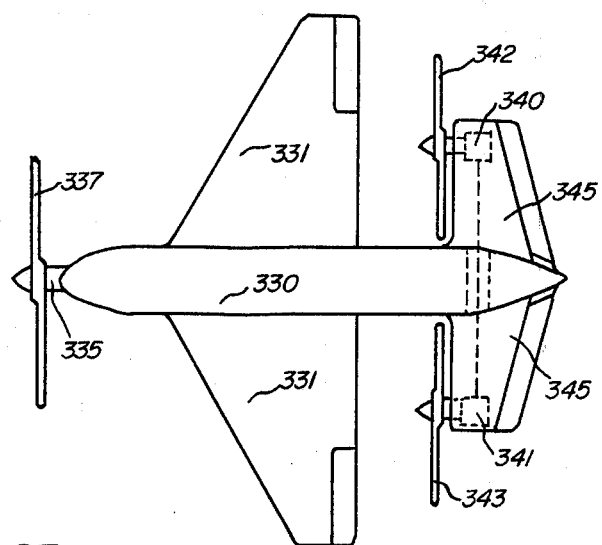
Fig.21
Fig.22
Fig.23
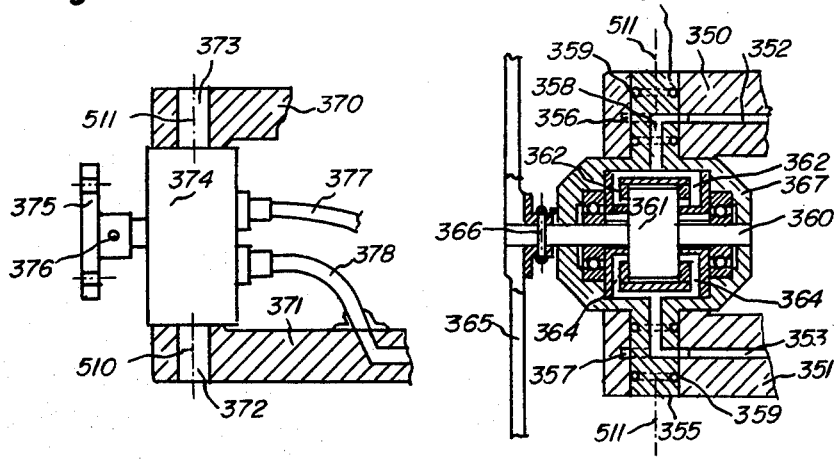

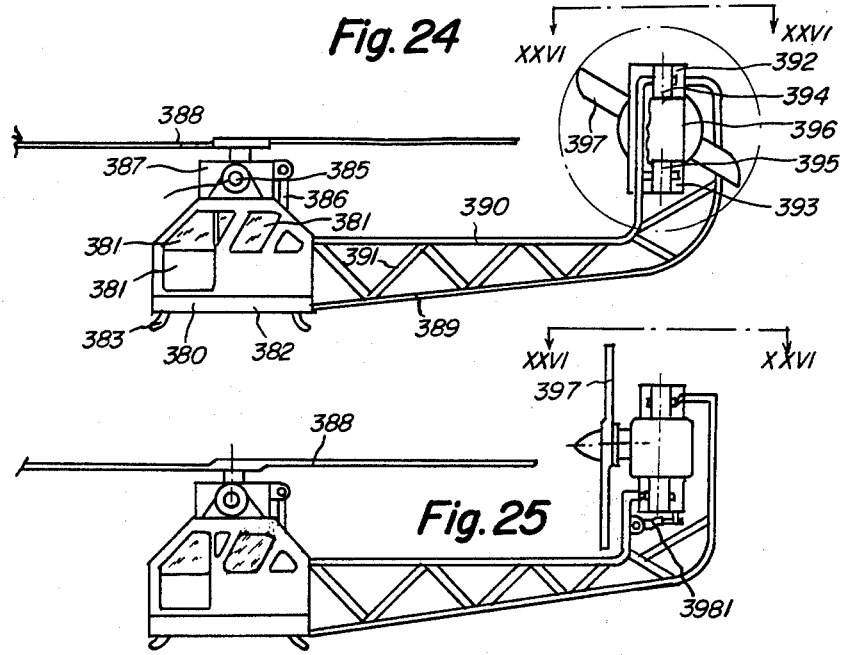
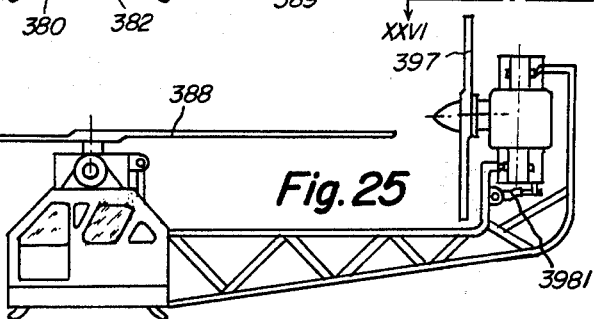
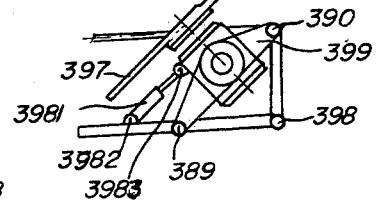
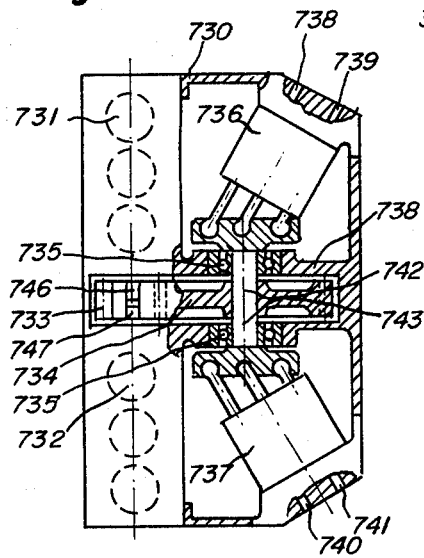
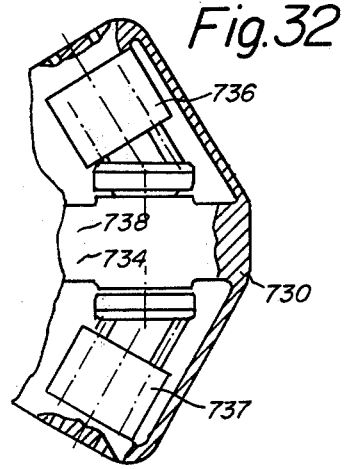

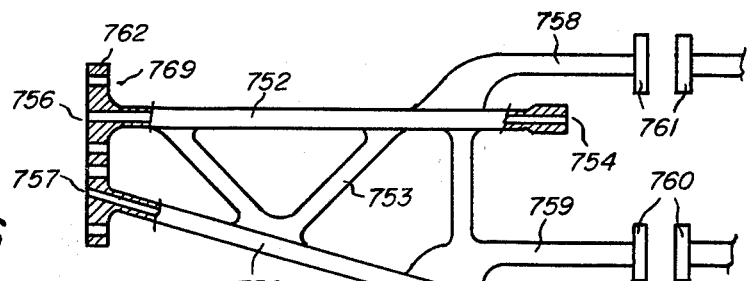
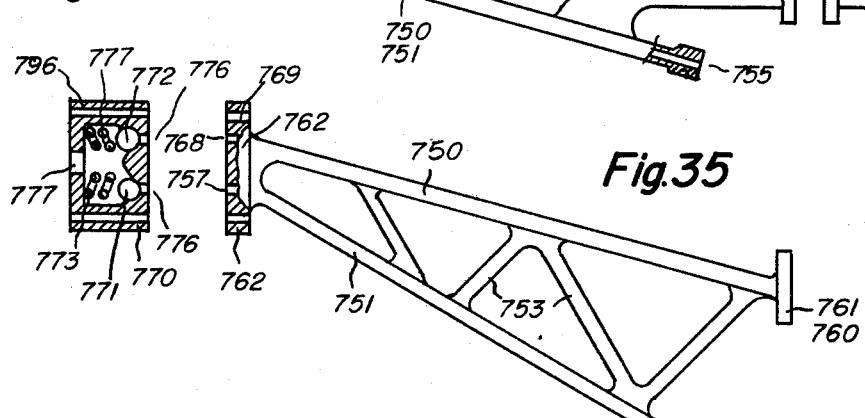
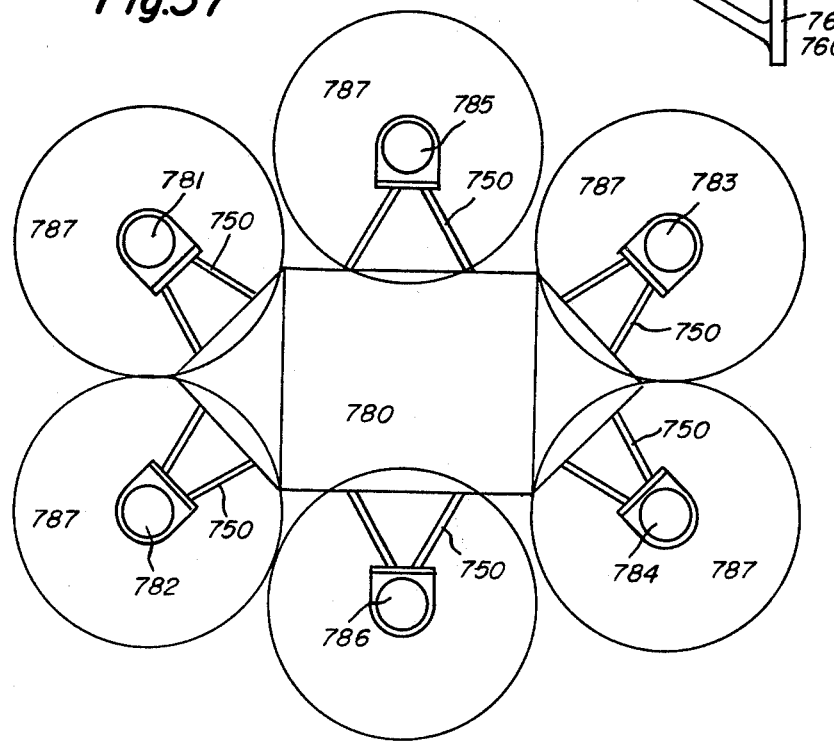

FLUID MOTOR WITH MOVEABLE MEMBERS WORKABLE INDEPENDENTLY OF ITS DRIVE MEANS

CROSS-REFERENCE TO RELATED APPLICATIONS

This is a continuation in part application of my earlier patent application, Ser. No. 800,756, which was filed on May 26, 1977 and co-pending at the date of filing of this present application. The application Ser. No. 800,756 is now abandoned. It was a continuation in part application of my application Ser. No. 465,413, which was filed on Apr. 30, 1974 and which is now also abandoned. This present application is partially also a continuation in part application of the now abandoned application Ser. No. 610,871, filed Sept. 8, 1975, which was co-pending at the filing date of this present application. Application Ser. No. 610,871 was a divisional application of the earlier application Ser. No. 416,237, filed on Nov. 15, 1973, now abandoned and which was a divisional application of the still earlier application Ser. No. 131,782, filed on Apr. 6, 1971 and which issued as U.S. Pat. No. 3,790,105 on Feb. 5, 1974.

BACKGROUND OF THE INVENTION

In road vehicles it has become necessary and is in some countries required by law, that the vehicle has a brake on the fluid motors which drive the wheels or tracks. A coupling was therefore mounted around the shaft of the motor and supplied with fluid for action against a spring means through the outside of the housing of the motor. The control fluid supply from radially outside through the housing is however unconvenient and in addition the entering fluid is prevented or braked from radial inward flow at high speed of the revolving clutch or coupling. The control devices of the known art are therefore uneffective at high rotary speeds of the motor.

By the invention the control fluid is led through the centre of the rotor and enters the to be controlled members, like coupling, clutch, wheel, propeller or others or their control devices like small fluid motors or hydraulic or pneumatic cylinders or pistons radially from inside or in an axial direction or in an inclined direction therebetween. These directions of control flow of the invention make the control and remote control possible also at the very highest rotary revolutions of the rotor and members. At same time the unconvenience of fluid lines outside of the housing are prevented. The control fluid enters the motor from its axial end and thereby the control fluid lines radially of the housing are spared and radial eccessive space is prevented by the invention.

SUMMARY OF THE INVENTION

It is an object of this invention to provide improvements of hydraulic or pneumatic fluid motors with control of members attached to said motors.

A specific object of the invention is to provide a control flow through a hollow rotor of a fluid motor and the means for effecting said control flow through said motor and sealing it in said motor.

A further object of the invention is, to provide a control flow to an arresting member associated to a rotary member of the motor for arresting the same and prevent rotation.

A further object of the invention is to provide a remote control to members associated to the fluid motor.

A still further object of the invention is to provide a control for an axial or radial move of a member associated to the fluid motor.

Another object of the invention is to provide an angular control to a member associated to the fluid motor.

Still another object of the invention is to provide a control for a variable pitch of a member or propeller associated to the fluid motor and revolved by said fluid motor.

A further specific object of the invention is to provide a control of a propeller from autorotational pitch to a stiffer angle of attack or in other words for a stiffer pitch when fluid under pressure enters the motor.

A still more specific object of the invention is to control the pitch of the propeller by the rate of pressure in the fluid motor.

A very specific object of the invention is to provide a further control flow for additional increase of the angle of attack of a propeller for example when a propeller is changed from lift to forward traction of a helicopter or aircraft.

Another object of the invention is to provide an airborne craft which can fly as a gyrocopter but take off vertically as a helicopter by taking off with lift propeller driven by fluid driven lifting motors while the vehicle in forward flight is driven by other propellers driven by other fluid motors and where said fluid driven lift motors may include means for allowing the propellers and or rotors of said lifting motors when no pressure fluid is supplied to said lifting motors. Another very specific object of the invention is to provide two separate fluid control means through the rotor or otherwise to the member associat to the motor, and a further object of the invention is to provide a variable pitch control to a propeller with different angles of attack during a revolution of said propeller.

The invention contains still further aims and objects, which are, for example:

to provide an airtravel vehicle consisting of a structure built at least partially by fluid lines;

to provide a propeller speed synchronization by proportionateness of rate in flow in separated flows;

to provide overOrunning one way coupling means in motors or in members attached thereto;

to provide or attach one way over running hydraulic means;

to provide helicopters with gyrocopter varifications or vice versa;

to provide a vehicle with inclination variation of its propellers;

to provide an airborne vehicle with a tiltable upper structure;

to provide pre-speed up gear means to hydraulic motors;

to provide an aircraft with pivotable propeller and tail structure;

to provide pivotable hydraulic motors in holders;

to provide pivotable fluid motors in fluid supply holders;

to provide a copter with pivotable tail rotor and/or with pivotable, tiltable main motor and propeller;

to provide a double pump set to an engine or engines for elimination of friction;

to provide a new propulsion system capable of x times mach speed without the use of heat sensible turbines;

to provide said system to vertical take off matters;

to provide separatable and transportable fluid motor holding body structures consisting mainly of fluid lines;

to provide a combination one way valve set for fluid motors;

to provide two- or multiple propeller vehicles with fluid motors;

to provide inclinable, pivotable propellers or duchts with propellers; and, to provide multiple separated flow pumps with effective design for proportional or equal rate of flow delivery in separated fluid lines by effective design improvements.

More details will become appearant from the detailed description of the figures and of the embodiments of the invention, which are described more in detail in the following in this specification.

BRIEF DESCRIPTION OF THE DRAWING

FIG. 20 is a view from the side onto a vehicle of the invention.

FIG. 21 is a view from top onto the vehicle of FIG. 20.

FIG. 22 is a longitudinal sectional view through an holding- and fluid motor arrangement of the invention.

FIG. 23 is a sectional view through holders, holding a fluid motor.

FIG. 24 is a view from side towards another vehicle of invention.

FIG. 25 is a similar view as in FIG. 24 showing a different setting.

FIG. 26 shows a portion of FIGS. 24, 25 seen from top.

FIG. 31 is a sectional view through another embodiment of the invention.

FIG. 32 is a view into a modified assembly of FIG. 31.

FIG. 34 is a view from the side onto a fluid line structure of the invention partially in sectional views.

FIG. 35 shows the structure of FIG. 34 from top.

FIG. 36 is a sectional view through a valve set of the invention.

FIG. 37 shows an example of a vehicle of the invention seen from top.

DESCRIPTION OF THE PREFERRED EMBODIMENTS

Figure 1:
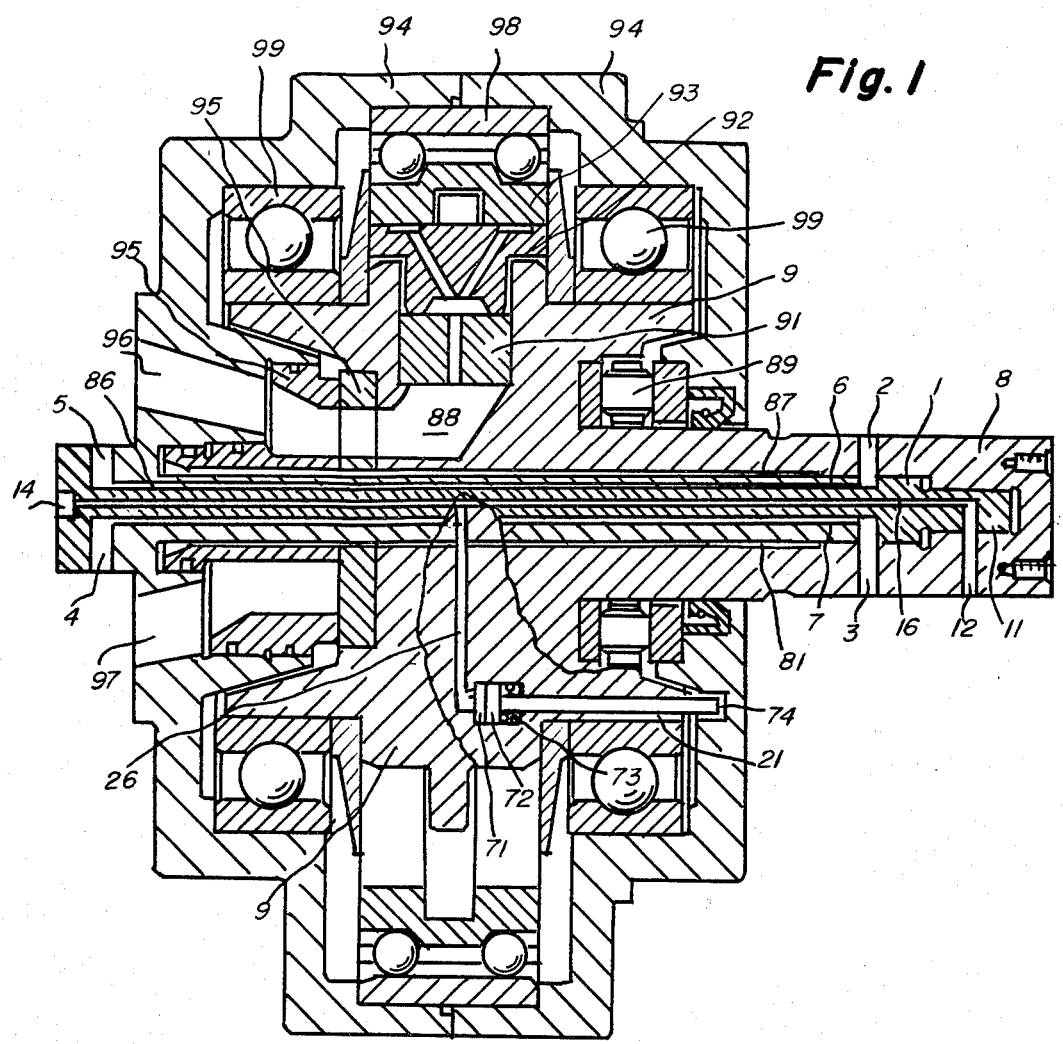
FIG. 1 is a longitudinal sectional view through a motor of an embodiment of the invention.

Referring firstly to FIG. 1, an hydraulic motor or fluid motor of the radial piston type is demonstrated. As it is known from the former art especially from U.S. Pat. Nos. 3,223,046; 3,225,706; 3,270,685; 3,277,834; 3,304,883; 3,305,195; 3,398,698; 3,468,262; 3,697,201; 3,831,496; 3,850,201; 3,889,577 or others, rotor 9 is revolvably borne in bearings 99 in housing 94. The rotor 9 contains cylinders of working chambers 88, wherein the displacement members or pistons 91 move radially inwards and outwards. Piston-shoe(s) 92 are associated to the piston(s) and radially guided by actuator 93. Actuator 93 may be a ring and be borne revolvably in bearings 93 also in housing 94. The axis of actuator 93 is distanced by an eccentricity "e" from the axis of the rotor 9, thereby causing the pistons and shoes to travel 2 times "e" = piston stroke, inwards and outwards. During outward move the pistons suction fluid through entrance port 96 and expell it through exit port 97 during the inwardly directed stroke. A fluid flow thrusting- and sealing-control body 95 may be assembled and contain passages wherethrough the fluid flows. A rotary control plate 995 may be inserted between the said thrust body 95 and the end of rotor 9 for the possibility of applying slidingly matching materials with little friction on losses and high relative speed slide capability.

Said rotary plate may also have passages, matching with the respective passages in the rotor 9. A thrust bearing 89 may be assembled for bearing the thrust of thrust body 95 against the rotor. Said bearing may be placed before the rotor and within the housing 9. Rotor 9 may have a shaft 8 which can be fitted to the rotor 9 or be integral therewith.

Instead of using a radial piston motor, it would also be possible to use an axial piston motor, if such rotor the said axial piston motor has a shaft or rotor going axially through the housing 9 without inclination of the rotor axis relatively to the axis of the housing. It would further be possible to use in a respective housing of the motor a radial vane machine, gear motor, trochoid motor or a vane machine of inventor's U.S. Pat. Nos.: 2,975,716; 3,158,103; 3,099,103; 3,111,905; 3,186,347; 3,173,375; 3,255,705; 3,246,574; 3,256,831; 3,269,329; 3,280,757; 4,184,820; 4,213,746; 3,301,232; 3,274,945; 3,263,621; 3,269,371; 3,320,898; 3,320,897; 3,379,006; 3,417,706; 3,412,686; 3,386,387; 3,416,460; 3,694,114; 3,844,685, 3,873,253 or others. As far as it is mentioned above, that these units might be utilized in FIG. 1 it is also true, that they might be used in any other housing of one or the other fluid motors of the other respective figures of the drawings of this application.

According to the invention, the rotor 9 is provided with a central rotor bore or hub parallel to the axis of the rotor 9. Said bore has referential 87. A stationary passage body 1 is inserted into bore 87 and it has a fitting portion 101 which tightly seals in a respective seal-portion in the shaft 8 or rotor 9. At the main extension however, passage body 1 and bore 87 may provide a wider clearance 86. Thrust body 95 may also have a respective bore 86, wherethrough the passage body 1 can extend. Shaft 8 or rotor 9 may have a fluid control passage 12 extending out of said shaft 8 or rotor 9. Control fluid passage 16 may extend from control passage port 14 preferredly located at the end of the housing 94, through passage body 1 to meet control fluid passage 16. Fluid for the control of a member, which may be associated to the shaft can be passed through said passages and port. Heretofore it was explained that control flow passages may be extended through or partially through the rotor or shaft. In the following it will from now on be written through the shaft or at other places it will be written through the rotor. Regardless however, if rotor or shaft is written it should be understood, that it can be either the shaft or the rotor. In addition there may be, but not in all cases necessary, further control fluid passages privided to extend from passage port 4 or 5 partially through passage body 1. For example, control fluid passage 6 may extend from port 5 partially through passage body 1 into control flow passage 2 which may extend out of said shaft to control another function of the member which is associated to the shaft 8 or to control an additional member associated to shaft 8. Still a further control fluid passage 7 may extend from port 4 partially through passage body 1 to meet control passage 3 for a further control of another function or member. Thus, having established at least one control fluid passage through passage body 1 to at least one control fluid control port 12, we can now, according to the invention control at least one function of at least one member which may be fastened to shaft 8. The further control flow control ports 2 and 3, if provided, may control further functions or members. We can do the control from stationary portions of housing 9. It is convenient to do so from the end of housing 9, as it is demonstrated in the figure. Because from the end of the housing fluid lines can be set easily to remote places for a remote control of the desired functions. The fitting portion in shaft 8 is revolving, while the passage body 1, which fits therein tightly sealing, is stationary. Stationary means relatively to the housing and so means rotary. Thus, if the housing revolves, passage body 1 revolves too and shaft 8 and rotor 9 may then be stationary. That is the reversal of the fluid machine. Control ports and passages 2,3,12 may be axially distanced from each other in order to keep the respective control-flows separated from each other. It is however also possible, to locate them at same radial face at same axial distance, as for example control ports 2 and 3 in order to control the control flows for excerting control functions at different rotary angles of shaft 8. Thereby different controls of members associated to shaft 8 can be controlled at different rotary angles.

For arresting the rotor 9 and shaft 8 an arresting recess 74 may be provided for example in the housing 94. An arresting pin 21 may be provided in rotor 9. The arrangement of housing and rotor might be reversed. Piston 72, associated to arresting pin 21 may be spring-loaded by spring 73 from one end and fluid pressure loaded from the other end, from chamber 71. Passage 26 may extend from one of the passages 6,7,16 of passage body 1 to thrust chamber 71. Thus, arresting pin 21 can be by remote control entered into arresting recess 74 for arresting the rotor 9 and shaft 8 preventing rotation of them.

Figure 1A:
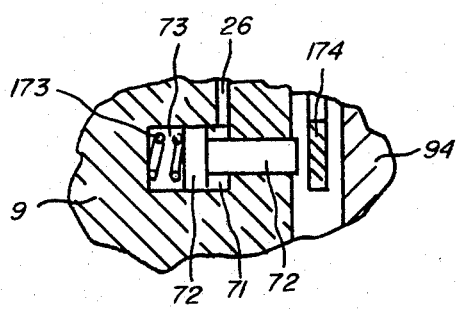
FIG. 1A shows a portion of FIG. 1 with another embodiment therein.

In FIG. 1A an opposite loading of stopper pin 72 is shown. FIG. 1A may be provided in FIG. 1 instead of the chambers, pin, spring, passage as discussed at end of last paragraph. Passage 26 may lead control fluid into thrust chamber 71 and thereby press piston 72 against spring 173 in space 73. Pin 72 is thereby taken away from arresting clutch plate or arresting portion 174. If fluid pressure leaves chamber 72, the spring 173 will press piston and pin 72 against arresting member or clutch disc 174 and said disc 74 against housing wall portion 94. Thus, the spring will automatically arrest the rotor 9 and shaft 8 at times when no fluid is supplied. That is the case, when the vehicle is resting. For staring the vehicle, fluid is entered into chamber 71 and thereby the arresting is opened, so, that the rotor 9 and shaft 8 can revolve. Control passage 26 can also be extended to an main entrance port or passage of the motor. That has the effect, that the arresting assembly 173,73,72,71,26,174,94 opens automatically when working pressure fluid is led to the motor. It spares specific remote control of the arresting arrangement by an operator.

Figure 6:
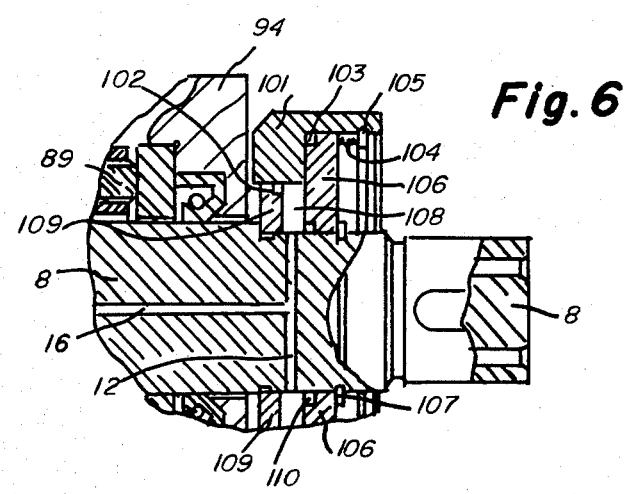
FIG. 6 is a longitudinal sectional view through still a further embodiment of a control means of the invention.

In FIG. 6 it is demonstrated, how an axially moveable member 101 can be controlled through the motor of FIG. 1 or any other of the figures. Pressure chamber 108 is closed to one end by cover 106 and may be closed partially at the other end by cover 109. Cover 106 can be fastened by holding- or partially springloaded holding arrangements 107,104,105. Cover 109 may be kept by a shoulder of shaft 8 or by any other suitable means. Seals 102,103,110 may be provided to seal chamber 108. Axially moveable member 101 may be loaded by the pressure in fluid in thrust chamber 108. For example to be moved against the housing 94. Control fluid flow can be led into and be passed out of thrust chamber 108 through control passages 16 and 12 as known from FIG. 1. Other suitable arrangements for axially moveable members can be done within the scope of this invention.

Remote control can be done in FIG. 6 similar to the respective arrangements or actions of FIG. 1 or others.

Figure 2:
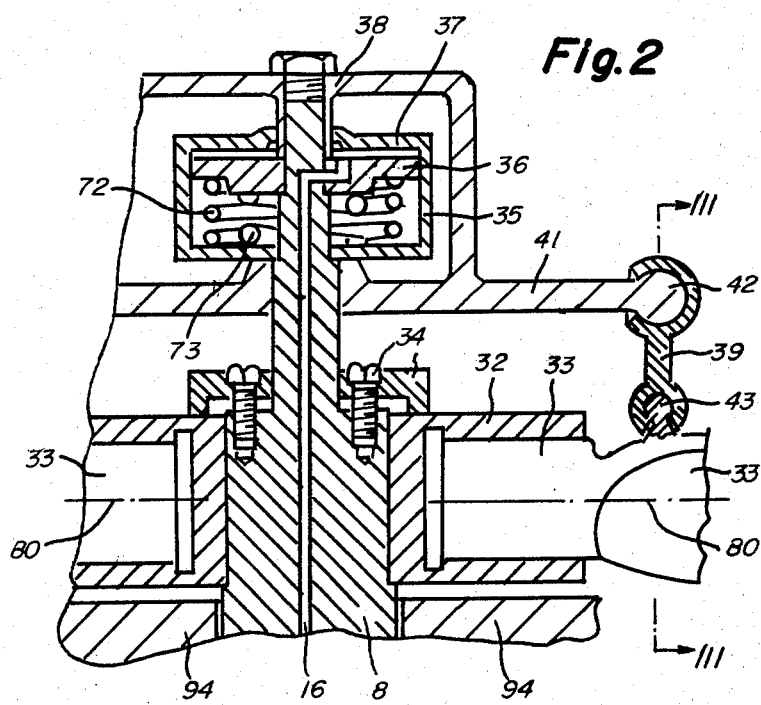
FIG. 2 shows another embodiment of control means in longitudinal sectional view.
Figure 3:
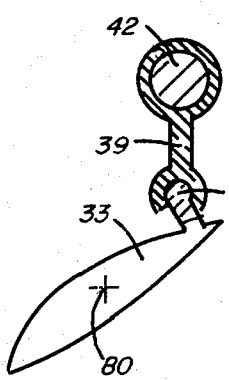
FIG. 3 is a cross-sectional view through FIG. 2 along line III—III.

In FIG. 2 and thereto belonging partial sectional view 3 a propeller holder or member holder 32 is fastened to shaft 8 by fasteners 34. Holder 32 has at least one preferredly cylindrical and hollow bearing portion 33. It is preferred to set two, four or any other number of such bearing portions. Pivotable members 80 are kept in the bearing portion(s) 33 to be able to pivote therein around pivote axis (axes) 80. The pivotable member(s) 80 shown in FIGS. 2,3 can be the feet of propellers 33. These figures further show an axially moveable control member 41 mounted to shaft 8 to be axially moveable on shaft 8. The top of FIG. 2 shows a stopper nut and the moveable member 38 is shown in the uppermost position, where it is prevented from further upwards move by end nut 38. From end nut 38 arresting bush 138 extends along shaft portion 8 to arrest axially moveable member 36 in the uppermost position. In housing 35 the spring members 72,73 are located to press against moveable member 36 and to press the same upwards. On top of moveable member 36 is within housing 35 the fluid pressure thrust chamber 37 provided. Passage 16, known for its functions from the discussion of FIG. 1, extends into thrust pressure fluid chamber 37. When fluid under respective pressure is led through control flow passage 16 into chamber 37, the moveable member 36 is moved from its uppermost or from a first position into a second, third or further position depending on the extend of the fluid pressure and the fluid pressure action against the spring means 73,573. Axially moveable member 36 is fastened to moveable transmission member 41. During move of member 36 the transmission member 41 moves in unison with member 36. During this move member 41 slides along bush 138 and may be guided at this move by a portion of shaft 8. Transmission member 41 may have at least one bearing portion 42 and each pivotable member, propeller, or propeller-root of propeller blades 80,83 may have another bearing portion 43. Pivotable or spaerically swingable connection member 39 may embrace both bearing portions 42 and 43 and thereby connect moveable member 36 over member 41, bearing portion 42, connection member 39 to bearing portion 43 of the pivotable member or propeller 80,33. Thus, when axially moveable member 36 moves, the movement is transferred to pivotable member 33,80 to pivot the same in holding portion 32. It is preferred, that in the first, the spring loaded position, when no pressure is in chamber 37, the propeller 33 is in autorotational angle of attack, when the motor is applied in a helicopter. And to be in the starting low angle of attack position when applied to an aircraft for horizontal move. Fluid passage 16 may either be set to a high pressure main fluid line, which carries fluif to drive the motor or be set to a separated control fluid line. When communicated to the main supply fluid line, pressure in fluid in the motor, which revolves the rotor and shaft of the motor will automatically press the propellers into a position of higher angle of attack. Thus, the helicopter will lift or the aircraft will fly with speed. Any higher pressure in fluid will suplly and create a higher angle of attack of the propeller. But, when due to an engine failure or fluid line brake the pressure in chamber 37 becomes down, the springs 72,73 will automatically set the angle of attack of the helicopter propeller into the auto rotational angle of attack. Thus, the helicopter will automatically have autorotation for an emergency landing, when the supply of driving fluid to the fluid motor fails. The embodiment of FIG. 2 of the invention, thus, supplies a high safety to fluid pressure driven helicopters and assures an autorotation even, when the pilot would fail to take action for autorotation in an emergency. FIG. 3 demonstrates, how axial movement of member bearing 42 effects the pivoting of pivotable member or propeller 33 around axis 80 of holding portion 32 of FIG. 2.

Figure 4:
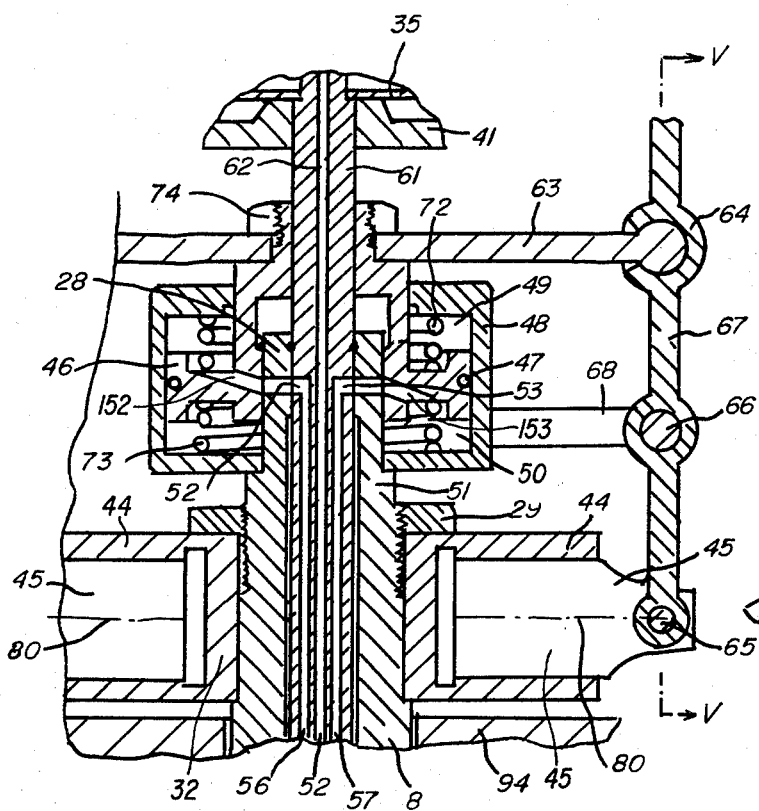
FIG. 4 is a longitudinal sectional view through another embodiment of a control means of the invention.
Figure 5:
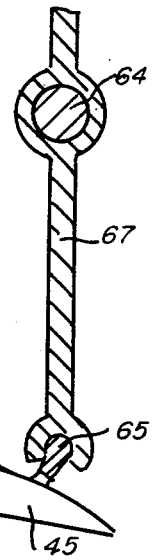
FIG. 5 is a cross-sectional view through FIG. 4 along the line V—V.

In FIGS. 4 and 5, which show the outer portion of shaft 8 and partially a modified embodiment thereof, the same arrangement as in FIGS. 2 and 3 may be provided on the end of passage body portion 61. It may be left away if not required. The hollow bearing portions 44 of holder 32 carry the roots 80 of propellers 45,80 pivotally around propeller axes 80 therein. Shaft portion 51 of shaft 8 holds a fluid pressure housing 48 with pressure chambers 49 and 50 which are separated from each other by an axially moveable piston 46, which can move in housing 48. Springs sets 72 or 73 may be provided each one at least in each of the pressure chambers 49 and 50. Chambers 49 and 50 are respectively be communicated to control flow ports and passages 52,53,56,57. Control piston 46 has a connection member 74 for fastening piston 46 to transmission member 63. Said transmission member 63 transfers over bearing member(s) 64 and connection member(s) 67 and bearing members 65 any move of piston 46 to propeller 45 and any such move results in a variation of the propeller's angle of attack. Bearing members 66 may be associated to connection member 68 for transfer of the angle of attack of one propeller blade in opposite angle of attack direction to a propeller blade provided diametrically respective to shaft 8. Members 63 to 68 are thereby members of a transmission means 63 to 68. Thus, when one of the propellers 45 of the figures experiences an increase of angle of attack the opposite propeller gets a reduction of angle of attack. Control fluid line 57 is communicated to control port 53. But control fluid line 56 is communicated to control port 52. The said control fluid lines are extended through passage and control body 1 which may have an extension 61 for bearing thereon an arrangement as in FIGS. 2 and 3. The arrangement of FIGS. 2 and 3, indicated by referential 41, is then to be revolvable on stationary portion 61. Fluid passage 152 extends from port 52 into chamber 49. But passage 153 extends from port 53 into chamber 50, namely the opposite chamber of piston move 46. But control ports 52 and 53 as well as passage entrances 152 and 153 may be substantially aligned in the same radial plane relatively to the axis of body extension 51. Extension 51 of passage body 1 is stationary, while seal portion 28 of shaft 8 fits therearound, seals on the respective portion 61 and revolves therearound. Control ports 52 and 53 are diametrically oppositionally located and extend circumferentially over 45 to 150 degrees each. At least one of ports 52 or 53 is supplied with pressure in fluid. The other may be freely communicated to an accumulator or to a space under flexible low pressure. The said other passage and port may however also be communicated to a fluid pressure source of a different pressure. Thus, when the shaft revolves, passages 152 and 153 communicate at each revolution once with port 52 and after about another half of a revolution with port 53. The higher pressure port 52 or 53 will thus during one single revolution once supply fluid under said higher pressure into chamber 49 and after about another half of a revolution into the opposite chamber 50. By this alternating connection of said chambers 49 and 50 to higher pressure and to lower pressure during a revolution of shaft 8 the piston 46 is at each revolution once moved upward and once moved downward. The upwards and downwards moves of piston 46 are transfered over transmission members 74,63,64,67,66,68,65 to both propeller blades. Thus, during one revolution each propeller blade 45 experiences an increase of angle of attack and a decrease of angle of attack. This arrangement of the invention is utilized to decrease the angle of attack of a helicopter propeller blade temporally during forward swing at flight and to increase the angle of attack of the opposite propeller blade temporally during backwards swing in flight. Thereby the lifts and drags of the propeller blades over all revolutions are balanced to about equalness, which quietens the propeller blades at forward flight of the helicopter, when relative speed differences appear during forward swing and backward swing of the respective propeller blade. Higher helicopter forward flight speed requires a greater difference of angle of attack during forward and backward swing of the propeller blades. This desiration is materialized by an increase of the pressure in the respective control port 52 or 53. Said higher pressure will compress the spring sets 72,73 more extensively and thereby increase the extension of the move of piston 46 and thereby the range of variation of angle of attack of the propeller blades 45 becomes increased. Thus, by this arrangement of the invention the heretofor used mechanical modifications of angle of attack of helicopter blades can not only be spared, but by remote control through fluid pressure the extension of the variation of angle of attack can be set to any requirements at different forward flight speeds of the respective helicopter. Further more, if equal arrangements are set to multiples of propellers on the same helicopter the given fluid pressure, if equally supplied to all propellers assures the same angle of attack variation at all of the propellers at all speeds in such perfectness, that the helicopter can fly at all speeds almost without any vibrations. Because drag and lift can be equalized during all rotary angular positions of the respective propeller blade during all of the revolution. Setting still more fluid flow control lines and ports can result in a more fine regulated propeller pitch control by respective fluid pressure arrangements and respective location and/or configuration of the control ports 52,53 and passages 152,153, or additional control ports and passages.

Figure 9:
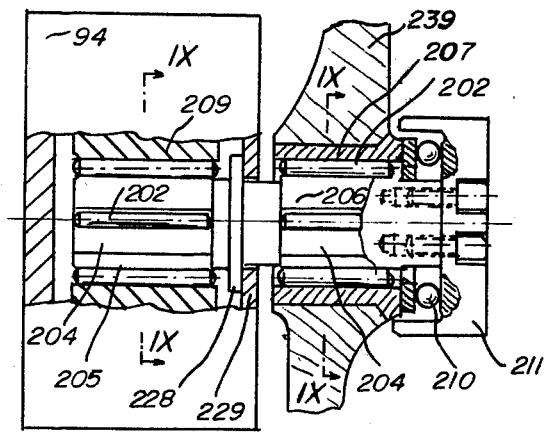
FIG. 9 is a partial longitudinal sectional view through another embodiment of another fluid motor of the invention.
Figure 10:
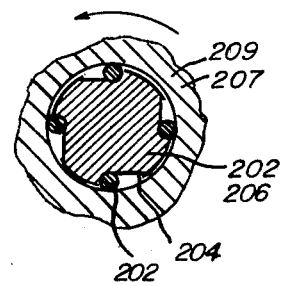
FIG. 10 is a cross-sectional view through FIG. 9 along the line IX—IX.

In FIGS. 9 and 10 the housing of the fluid motor, which is demonstrated in FIG. 9 contains in the known way the usual arrangement including rotor 209. Rotor 209 is hollow. Shaft 205 extends from the rotor in at least one axial direction and a portion of the shaft is located in the hollow rotor 209. Over-running one way clutch means are provided between shaft 205 and rotor 209. They may consist of rollers or balls 202 and inclined faces 204. The shaft 205 may have a flange 228 constituting a thrust bearing to run along the thrust bearing guide face portion 229 of housing 94.

The purpose of this arrangement is, to provide a one-way overrunning coupling between the rotor and the shaft. This feature is especially applied in helicopters or Gyrocopters. In helicopters for autorotation of the propeller, which is associated to the shaft of the motor. Thereby accidents can be prevented. Because the pilot does not need any more to take care of autorotation levers. The autorotation appears from alone when the engine fails, because when the rotor 209 stops to revolve the overrun coupling means permit the shaft to continue to revolve. There are other applications of this arrangement too, but the autorotation of a helicopter is the best understood and known. In a gyrocopter the fluid motor may serve for vertical take off. Later, when the gyrocopter has obtained forward speed the propeller starts to revolve faster and runs then with faster speed than the rotor 209 does. The overrunning coupling means of these and other figures of this application assure, that the propeller and shaft can revolve faster, than rotor 209. FIG. 10 shows the generally known arrangement of a one way overrunning coupling. However, applied in this case in the hollow rotor of the motor of FIG. 9 or in the propeller bush 207 thereof.

Instead of providing the overrunning coupling means in rotor 209 of FIG. 9 it may also be applied between shaft portion 206 and bush 207 of a revolvable member or propeller 239 of the right end of FIG. 9. Hardened bush 207 may be assembled in rotor member 339. A holding means 211 can be provided and fastened to shaft 205 for holding a thrust bearing 210. Because the rotor member or revolving member 239 may be a propeller and may apply thrust which could not be borne without eccessive friction, if shaft 205 stops, but bush 207 and member 239 continue to revolve.

To set the overrunning one way coupling means around shaft portion 206 as shown in the right portion of FIG. 9 is very convenient when the rotor has no space for a centrical bore for bearing the shaft portion 205 therein or when by any other reason the motor has no coupling one way means. Thus, by utilizing the arrangement of the right portion of FIG. 9 any conventional fluid motor can be provided with the external application of a one-way overrunning coupling means as in the right portion of FIG. 9. Instead of providing the overrunning coupling means only in the rotor 209 or only in the external bush 207, both applications can be applied as shown in FIG. 9. One one way coupling in the rotor 209 and another in the bush or revolvable member 207 or 239. This arrangement also shown only in FIG. 9 may similarily be applied in any other suitable fluid motor.

Figure 11:
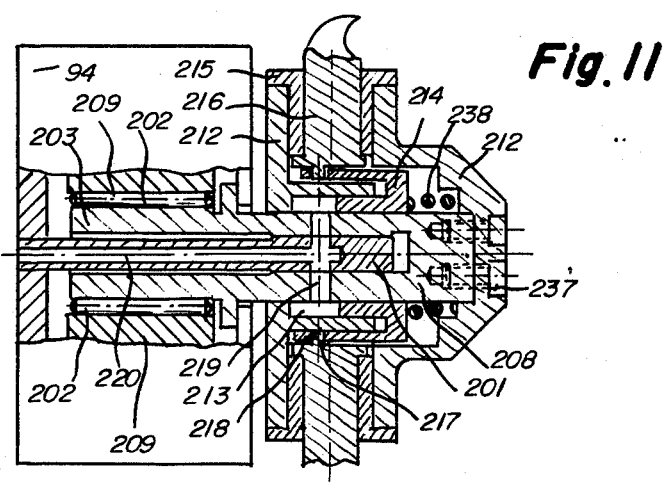
FIG. 11 is a partial longitudinal sectional view through still another assembly of the invention.
Figure 12:
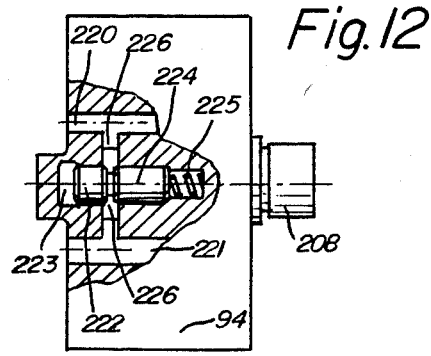
FIG. 12 shows a partial sectional longitudinal view through a still a further assembly of an embodiment of the invention.

FIG. 11 shows a longitudinal sectional view through another fluid motor of the invention. This embodiment of the invention combines a one way overrunning coupling means and an internal pitch-angle of attack-inclination-or pivote adjustment or control means with a fluid motor. Housing 94 contains again the known motor arrangement including a hollow rotor 209. Shaft portion 203 is within said hollow rotor and overrunning one way coupling members 202 and thereto associated means for example as in FIG. 9 are provided between shaft portion 203 and hollow rotor 209. Shaft portion 203 has an outward extension 208. Both shaft portions 203 and 208 are partially hollow to contain passage body 201. Passage body 201 may be stationary or rotary, depending on design. Either the left or right end portion of passage body 201 is relatively rotary to the portion of housing 94 or of shaft 208 and sealingly fitting in the respective portion. Passage body 1 has a control fluid passage 220 which extends into transfer passage(s) or port(s) 219. Passage(s) 219 extend to a fluid pressure chamber 213 wherein a piston 214 is axially moveably fitted and sealed. Opposite of piston 214 the spring means 238 may be provided to act in contrary direction to the action of fluid pressure in chamber 213. So, that a power play appears between the forces in fluid in chamber 213 and the spring means or thrust means 238. Piston 214 moves more to the right or more to the left in FIG. 11 depending on the forces in chamber 213 and means 238. A holding member 212 may be fastened to shaft portion 208 by holding means 237. Holding member 212 may have radial bores or otherwise directed bores for the insertion of buch(es) 215. Bushes 215 may hold the feet of respective pivotable members or propellers 216 in holding member 212, so, that the pivotable members 216 may pivote in said member 212 but are otherwise strongly fastened by bushes 215 or other fastening means of holding member 212. The foot of each pivotable member 216 may have an eccentrically provided portion or means 217 for entering into a respective engagement with a reception or connection means 218 of a portion of piston 214. Thus, when fluid control flow presser is led to passage 220, which may be done from a remonte place, the said control flow pressure enters chamber 213 and drives the piston 214 rightward in the figure and thereby varifies the angle of attack, pitch, inclination or pivote angle of pivotable member(s) 216 via the mentioned members 217 and 218. When the pressure in the control flow through passage 220 becomes reduced the varification of said angle of attack, inclination, pitch or pivote angle of said pivotable member(s) 216. Any desired pivote angle can be set by the respective hight of the pressure in the control flow.

The application of this motor is especially suitable for helicopter, gyrocopter or similar craft. And also for aircraft propeller. At vertical take of the suitable angle of attack is set by a medial fluid pressure in the control flow. At high forward flight of great speed the angle of attack becomes further increased by a still higher pressure in the control flow in passage 220. At an engine failure the spring means 238 automatically sets the angle of attack of a helicopter or gyrocopter propeller into the autorotational angle of attack, because the springs 238 are now stronger, than the pressure in control fluid passage 220. Because at an engine failure there may be no pressure in line 220, because if no engine works any more, there is no fluid supply.

Heretofore mechanical means like one way couplings have been used in the earlier figures to make a higher speed rotation for revolvable members possible to overrun the rotary speed or rest of the rotor of the respective fluid motor. Hereafter it will be shown at hand of FIGS. 12 to 15 that this helpful effect can also be reached by hydraulic control means within or on the respective fluid motor.

FIG. 12 symbolizes again a housing 94 with fluid motor members and a fluid motor assembly therein. It has an entrace port 220 and an exit port 221. Shaft 208 extends from the motor housing 94 as usual. According to this embodiment of the invention a flow-over passage 226 is provided from entrance passage 220 to exit passage 221. It extends through a chamber 222 wherein a fitting piston 224 is axially moveable. Spring means 225 presses piston 224 into the left position in the figure. A control fluid flow entrance port 223 is associated and communicated to chamber 222. Normally the piston 224 is in left position which is the closing position. Passage 226 is thereby closed. However by sending pressure in a control fluid flow into port 223 and thereby into chamber 222 the piston 224 is moved against spring 225 into the right position, as shown in the figure. This is the opening position of piston 225.

At the opening location of piston 225 the fluid in the motor can freely flow from entrance passage 220 through opened passage 226 into exit passage 221 or vice versa. Thus, the engine can be stopped and the shaft 208 can freely revolve, for example in autorotation, of a helicopter, when the motor of this figure is assembled to the propeller of a helicopter. Without opening of passage 226 this would not be possible. A resting pump, which is connected to the ports 220 and 221 of the motor would block any rotation of the rotor of the motor of the figure, because the fluid would be stopped in the expanding and contracting fluid operation chambers of the motor. The opening of overflow or transfer passage 226 of the invention however makes it possible, that fluid of the decreasing chamber volumes can pass through passage 226 into the volume increasing chambers in the main chamber arrangement of the motor. Thus, an over running means is obtained by the passage 226 of the invention and this can even act in both rotary directions. It can be remote controlled by a control fluid flow to control flow port 223.

Figure 13:
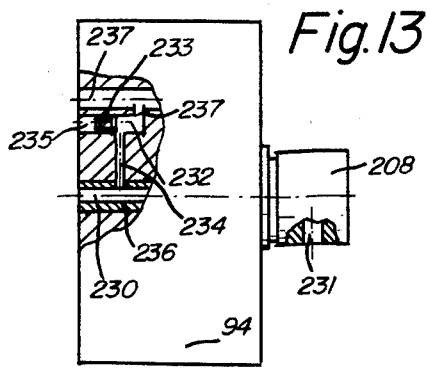
FIG. 13 is still another longitudinal sectional partial view through another arrangement of the invention.

FIG. 13 shows a motor of a related ability. It may have a control flow passage 230 in passage body or other means 236 for the supply of controlling fluid to exit port 231 for handling the control of moveable members, if those are associated to shaft 208. The motor gain contains in housing 94 the respective motor assembly and has an entrance port 237 and an exit port not shown in the figure. A chamber 232 contains a relatively thereto moveable piston 233. At one end of chamber 232 is a communication passage provided to communicate with the entrance port 237. At the other end of chamber 232 may be a control flow entrance passage 235. From a position or location of chamber 232 which can be closed by piston 233, a further passage 234 may extend either to the exit port or to a further control flow passage, for example 230, depending on the actual requirement and design. The main supply fluid pressure from the entrance port 237 may thereby enter into chamber 232 to press the control piston 233 into the opening position. The main fluid pressure passes then on from entrance port 237 through chamber 232, passage 234 and control flow passage 230 into control flow exit 231 for controlling a moveable member of shaft 208. This gives an automatic control of the moveable member associated to shaft 208 by the pressure present in the main supply line. For example, a higher pressure in the main fluid supply line will result in higher motor rpm and at same time in higher angle of attack of a propeller associated to shaft 208 of this motor. The said control of angle of attack or like by main fluid supply flow can be prevented by sending a control flow of higher pressure into control port 235 for pressing piston 233 into the closing position in chamber 232.

Instead of communicating passage 234 to the medial control passage 230 it is also possible to communicate the passage 234 to the entrance port of the motor. The piston 233 is then automatically in opening position as soon as main flow supply pressure enters the motor. An automatic overrunning ability is then provided. But it can be stopped for example for a vertical take off or landing by sending a control flow of higher pressure into entrance passage 235 for moving the piston 233 into its closing position.

A further possibility is to use port 237 as the exit port of the motor. When an engine fails, the still revolving member on shaft 208 will attempt by kinetical energy to continue to revolve. That makes a pressure in the decreasing chambers of the exit half of the main chambers of the motor. This pressure enters exit passage 237 and forces the piston 233 into its opening position. Thus, the rotor and shaft 208 can now revolve freely and this action to free revolving occurs automatically at an engine failure. Provided naturally, as will be the case in forward flight, that no pressure acts in control flow port 235.

Figure 14:
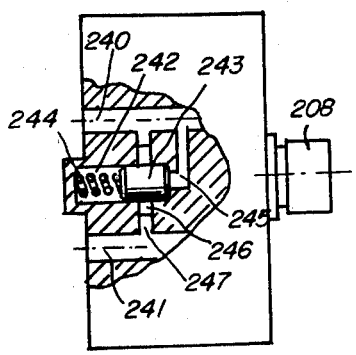
FIG. 14 is again a longitudinal sectional view through a further embodiment of the invention.

FIG. 14 demonstrates a further automatic overrunning effect in the motor of this figure. Housing 94 contains the motor arrangement and shaft 208 extends therefrom. Passage 240 is the exit passage while passage 241 is the entrance passage. Control piston 243 is moveable relatively to chamber 242 and spring loaded from one end. Transfer passage 246 extends from exit port 240 through chamber 242 to entrance port 241. The piston 243 is shown in the figure in its closing location. Passage 245 extends from one end of chamber 242 into the exit port. Thus, when an engine or fluid flow supply fails or is shut off, the their volume decreasing chambers of the exit half of the motor apply a pressure into the exit port 240 and thereby into passage 245 and into chamber 242 whereby control piston 243 is moved again spring force 244 into the opening location. Fluid can now freely passe from the exit half into the intake half of the working chambers of the motor. The action occurs automatically whenever an engine fails or the fluid supply is stopped by the pilot.

Figure 15:
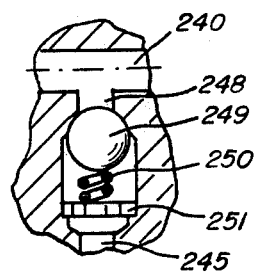
FIG. 15 is a modification corresponding to another arrangement associable to that of FIG. 14 and again it is shown in part.

FIG. 15 shows a safety arrangement. From one of the main ports of the motor to the other of the main ports or to a control chamber, for example 242,222 or 232 of the former FIGS. 12 to 14 a passage 248 contains a spring loaded overflow valve 244. By spring 250, which may be kept by holder 251 the passage 248 is closed to prevent accidental opening at too low pressure in fluid line 240. Thereby valve member 249 acts as a safety brake. Higher pressure in fluid line 240 however opens valve 249 to make a free flow from passage 248 into passage 245 and from there into the communicated passage or space possible.

Figure 16:
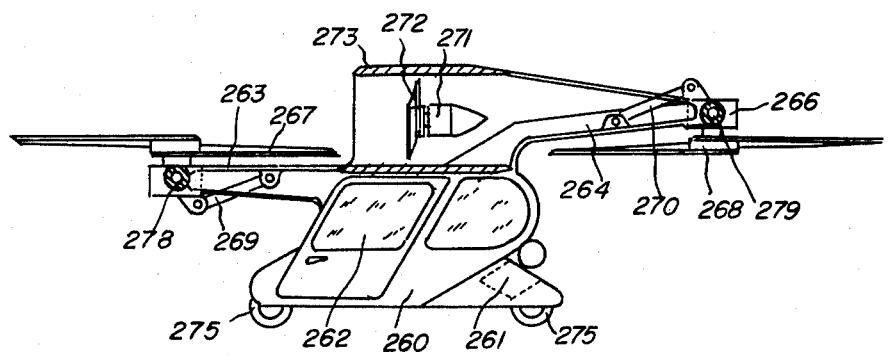
FIG. 16 shows an aircraft of the invention seen from the side.
Figure 17:
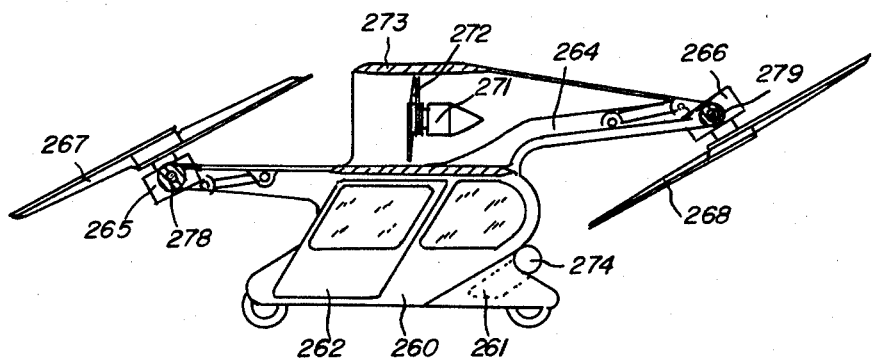
FIG. 17 shows the craft of FIG. 16 in a modified flight situation.

FIG. 16 and FIG. 17 show a gyrocopter or helicopter seen from the side. Both in different flight condition. Body-structure 260 may have ground engaging means 275 and fuel or fluid tanks 274 as well as a power plant with hydraulic fluid supply means and contain a passenger or freight cabine 262. Propeller holding arms 263 and 264 are attached to the body structure and said propeller holding arms or propeller-motor holding arms may contain the fluid lines to the motors or may be fluid pipes to the propeller motors, so, that the fluid lines or fluid pipes form the respective propeller holding arm. Motors, namely fluid motors, 265 and 266 are fastened into said propeller arms and each shaft of the motor may be associated to a propeller 267 or 268. A third propeller 272 may be associated to a third fluid motor 271 to supply the forward motion of the vehicle. Each of the said fluid motors is driven by fluid supplied through fluid lines from the fluid supply means on the vehicle. Fluid motors 265 and 266 may be fluid motors with overrunning one way means for enabling the propellers to continue to revolve when the fluid flow supply is stopped by the pilot or by an engine failure.

Thus, when the vehicle acts as a gyrocopter, all fluid flow power may be supplied to the fluid motor 271 for moving the vehicle forward. The bearing propellers 267 and 268 will then revolve as gyrocopter propellers or as propellers in auto-rotation. For vertical take off, climb, descend or landing all fluid power may be led to the main propellers 267 and 268 proportionately for effecting a safe climb or descent.

In FIG. 17 a further object of the invention is demonstrated. It shows, that the fluid motors 265 and 266 are pivotably fastened on the propeller bearing or holding arms 263 and/or 264. Inclination actuators 269 and/or 270 may be provided to effect the control of the inclination and the extension thereof. They may be remote controlled from the pilot cabine. By inclining the propellers forward the vehicle obtains forward flight and at same lift maintains lift or bearing lift for levelled flight. The angle of forward inclination defines the ratio of lift-force to forward-force of the propellers and any desired ratio between these forces can be managed by the inclination controllers 269 and/or 270. In order to make a high inclination possible it is best to use a traction propeller 267 in the front portion of the vehicle, located above the propeller holding arm 263. But on contrary thereto the rear portion of the vehicle shows in the FIGS. 16 and 17 a pushing propeller 268 below the propeller arm 264, which is the rear arm to the rear portion of the craft for holding the rear propeller and fluid motor 266. By this arrangement the rear propeller can incline almost 90 degrees for fast forward flight, which would be difficult to obtain, if the rear propeller would also be located above the propeller holding arm 264. Because at high inclination it would move against this arm. Thus, the arrangement of FIGS. 16 and 17 with its novel rear holding arm prevents an otherwise heavy, extensive and expensive arrangement. The rear holding arm 264 may be associated to or contain a housing or duct 273 for holding or for holding therein the fluid motor 271 with forward motion propeller 272. Thus, a very harmonic and streamlined structure of a vehicle is obtained by these figures and the vehicle of these figures is capable of exactly vertical flight as well as of relatively high speed forward flight. At high speed forward flight all propellers may act together to apply forward thrust, or, if fluid flow to the lift motors 265 and 266 is stopped or appearing from engine failure, the propellers 267 and 268 may revolve in autorotation or in gyrocopter effect.

Figure 18:
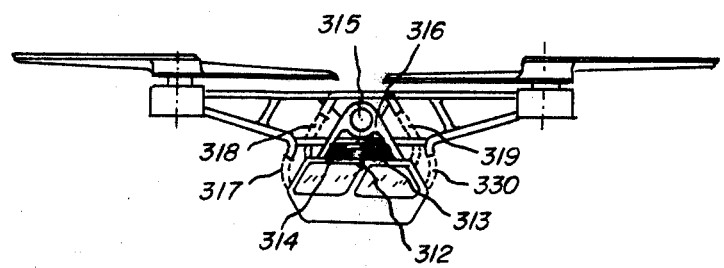
FIG. 18 shows still another embodiment of an aircraft of the invention; seen again from the side.
Figure 19:
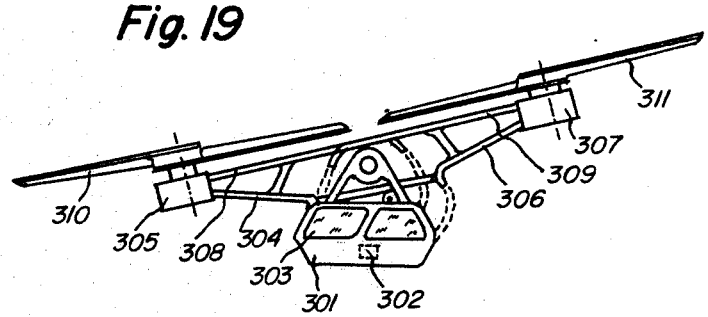
FIG. 19 shows the craft of FIG. 18 in another flight situation.

FIG. 18 and FIG. 19 show another vehicle of the invention seen from the side. Both again in different flight situations. A fluid motors and propellers carrying structure, preferable to be made up by the fluid line pipes to prevent unnessessary weight, is the upper portion of the vehicle. This upper portion is provided with a hanging means 315 whereon the bottom portion hangs by hanging member 316. Hanging means 315 and 316 provide an ability to pivot relatively to each other, whereby it is made possible, that the upper body inclines relatively to the bottom portion of the craft or the bottom portion of the craft inclines relatively to the upper body structire of the craft. An inclination control means 312 is associated to the upper body structure and to the bottom portion of the vehicle. It may be swingable fastened to the bottom portion by swing holder 313 and to the upper body structure by swing holder 314 with length adjuster 312 therebetween. The upper body structure consits preferably of fluid line 304 to the front motor 305, return fluid line 308 from the front motor to the pump means or to the tank and further of the fluid line 306 to the rear motor 307 and the return fluid line 309 therefrom to the tank or pump means. Ribs may be added to the fluid lines to supply respective stability to the fluid line frame. Instead of fluid pipes any other structure might be used, but to built the upper body structure by the main fluid lines as pipes makes the most less weight and economic vehicle. In order to make the inclination between upper body structure and bottom portion of the vehicle possible, either swing connections are set within the main fluid lines and return lines, or, as shown in the drawing, flexible fluid hoses 317,318,319 and 320 are set from each one of the supply fluid lines and return fluid lines to the fluid tank or to the fluid flow supply means 302 in the bottom portion or any other suitable place of location in the vehicle.

Fluid flow supply means 302 is associated to a power plant and supplies preferably at least two flows of separated flows of proportionate or equal rate of flow. This separatedness of flows and proportionateness of rate of flow assures, that the front motor and the rear motor 305 and 307 at all tims revolve with to each other proportionate or equal rotary velocity and thereby so do the front propeller 310 and the rear propeller 311. This proportionateness of rotary angular velocity of the propellers assures a good balance of lift of the front portion and of the rear portion of the vehicle. The bottom portion, hanging below the pivotable hanger 315,316 and carrying the heaviest weight, like power plant, pumps means, tanks and passengers or pilot provides the gravity centre below the hanging means. Said gravity centre is formed by the weights of the bottom portion and is alltimes at steady flight below the handing centre 315. It is tracted by the force of gravity of the earth stright vertically downwards below the hanging centre 315. Thus, when the upper body structure is adjusted to a normal rectangular position relatively to the bottom portion, the craft is ready to climb vertically or to descent vertically. But when by actuating the inclination controller 312 the upper body structure is inclined forward or backward, the vehicle flies correspondingly forward or backward. The inclination controller acts steplessly and thereby a steplessly variable inclination of the upper body structure of the craft can be materialized. Thereby any desired ratio between forward or backward thrust and lift can be obtained. The flexible fluid lines, namely fluid pressure hoses 317 to 320 form an important part of the assembly, because they make the inclination between upper and bottom portion possible in combination with pivotable hanging 315,316 in the most convenient and most inexpensive way. The craft has been built and can be seen at applicant's research institute. Side rudders or turn rudders or stabilizers may be added to the craft upon wish. The power supply unit of applicant's U.S. Pat. No. 4,009,849 can supply a double power-and fluid flow supply plant for an excessive safety.

In FIGS. 20 and 21 another embodiment of a vehicle of the invention is demonstrated. It shows, that it is now possible in accordance with this invention to lift a substantially otherwise horizontally flying aircraft with wings stright vertically up into the air. Body 330 has the passenger cabine 332 and a power plant cabine or holder 344 which supplies the separated hydraulic fluid flows from the power-plants fluid flow supply means 344 to the fluid motors via respective fluid lines. In the front portion of the vehicle is a pivoteable fluid motor 335 located which carries and drives a preferredly larger diameter propeller 337. In FIG. 20 motor and propeller 335 and 337 are shown in the vertically working position.

The horizontally tracting position of motor and propeller 335 and 337 is shown in FIG. 21. For inclined flight direction between vertical and horizontal flight any inclination therebetween can be steplessly variably set. The rear portion of the craft carries pivotably arranged elevators 345 which can pivote around pivote centre 339. The elevators carry fluid motors 340 and 341 diametrically oppositionally located relatively to the medial longitudinal face of body 330. Fluid motors 340 and 341 carry and drive preferredly smaller diameter propellers 342 and 343. For vertical flight the elevators and thereby the motors and propellers are pivoted into vertical position as shown in FIG. 20. For forward flight they are pivoted into horizontal position for tracting the aircraft forward as shown in FIG. 21. Any desired inclination therebetween can be stepplessly set if so desired. During high speed forward flight either the rear propellers or the front propeller can be adjusted by the remote controlled moveable members of the shafts of the respective motors into a 90 degree angle of attack position. Then they act as a streamlined body without traction, but also without major resistance in air. The whole power of the craft can then be send to that propeller or to those propellers which shall drive the vehicle economically forward. The fluid lines to the fluid motors and the return fluid lines from them are inside of the craft and therefore unvisible in the drawings. The body may have a retractable ground supporting member 334 and the elevators can, if desired, be the rear ground engaging support. A specific feature of the arrangement is, that all propellers at vertical flight are so remote from the wings, that they do not blow air flow over the wings. Downward tracting airflow on the wings is thereby prevented and an economic vertical flight can be materialized. Instead of setting the rear motors and propeller onto pivotable elevators they might be set on separated holders behind the wings or on any other suitable location. Instead of using a single front motor and propeller a plurality of motors and propellers might be set and respective modifications might be done on the rear portion as long as the ghist of the invention, to materialize an economically vertically and horizontally flying winged aircraft is maintained in accordance with the invention.

FIG. 22 is a longitudinal sectional view through another embodiment of a fluid motor of the invention. In particular it demonstrates, how a pivotable motor can be obtained and how the pivotable fluid motor is pivotable borne in a holding means. Holders 350 and 351 have with each other matching bearing bores of equal axes, wherein the swingable bearing portions 354 and 355 of the fluid motor housing are tightly fitting pivotably borne. Holder member 350 has the fluid line 352 wherefrom the fluid flows through fluid line 358 in bearing portion 354 354 and through passages 362 in housing 367 to the rotor in actuator 361 of the fluid motor.

The fluid motor could be of any structure of my known or other fluid motors. However for a simple understanding the fluid motor of my patent 3,858,486 is demonstrated by actuator member 361 in order to show the both ends fluid flow supply and exit to and from the rotor. The latter is, as known, within the actuator ring 361. The exit fluid passages 364 are provided through housing 367 to extend to fluid passage 357 in bearing portion 355 and from there the exit fluid flows through passage 353 in holder 351 back to the tank or pump. For opposite revolution of the shaft 360 of the motor the direction of flow can be reversed. Propeller 365 may be fastened by a flange and holding means 366 to shaft 360. Shaft and rotor are borne in bearings, which are shown in the figure without referential numbers, because the action of a bearing of common use is generally known.

Also generally known are seal means like O-rings, which are also shown in the figure but which have no referential numbers by same reason. For convenience of friction free pivoting or swinging the annullar grooves 356 and 357 may be provided in holding members 350 and 351 for giving equal pressure from the whole 360 degrees radially to the respective bearing portions 354 and 355 at that area, where the flows pass from the passages 352 and 353 into the passages 358 and 357 in the bearing portions of the fluid motor. For setting one end or radial supply motors the fluid passages are correspondingly modified within the scope of this invention.

In FIG. 23 another pivotable supported fluid motor is shown. This motor can be of any known type. It must however be provided with bearing portions 373 and 372 of cylindrical configuration or any other suitable configuration to be borne in holder members 370 and 371. Thus, motor 374 can pivote or swing around axis 510 and motor 367 can swing around axis 511 or pivot therearound. Flange 375 can be fastened to the shaft of motor 374 by respective bolts, rivets or fasteners 376. The bearing portions 373 and 372 of the fluid motor of this figure have no fluid line passages. Therefore flexible fluid pressure hoses are set to the entrance and exit ports on the end of the motor 374 or onto the housing thereof. Without these flexible fluid pressure hoses the motor would not be able to pivote or swing around the axis 511 during operation under fluid pressure supply and return flow of fluid. If so desired, fluid pressure hose 378 may extend with the other end to a passage in holder member 371. Fluid pressure hose 377 is shown to extend freely in order to indicate that it may be set to any fluid pressure passage at any suitable place.

FIG. 24 and FIG. 25 demonstrate a fluid pressure operated and controlled helicopter or gyrocopter, while FIG. 26 is a view from XXVI—XXVI onto the tail portion of the vehicle of FIGS. 24 and 25 in a partially turned position. Body 380 has power plant and assessory compartment 382 and passenger or freight cabine 381. The tail 389 and 390 with ribs 391 extends from the body 380 and carries fluid motor 396 which carries on its shaft the propeller 397 and drives the same. The tail may be constructed of the delivery fluid line 390 and the return fluid line 389. There may also be multiples of respective fluid lines. Ribs 391 may be set to said fluid lines for providing respective stability. Thus, according to the invention, the tail is or may be established mainly by the fluid lines, which for this purpose may be thin steel pipes. Fluid motor 396 may be pivotably borne in holding portions 392 and 393. For this purpose the motor 396 may have bearing portions 394 and 305 to be hold and borne in portions 392 and 393. A pivote actuator means 3981 may be set between tail—structure member 3982 and motor fastener portion 3983. By shortening or lengthening of said actuator member 3981 the tail motor and propeller 396 and 397 may be pivoted about 90 and 150 degrees. FIG. 26 proposes the details of the holding structure to make such large pivoting possible. The actuator member 3981 might be a hydraulic or pneumatic cylinder with piston therein and thus, it can be remote controlled, if so desired. Motor holding member 399 may be fastened to the tail structure by holders 389 and 390 as seen in FIG. 26 and said holders 389 and 390 are part of the mentioned fluid lines or connected therety for transfering fluid to and from the motor 396 through holding portion 399 which for this purpose should be provided with respective passages through it. Body 380 may carry a main fluid motor 387. The respective shaft of fluid motor 387 carries the main propeller 388 and the main motor 387 drives said propeller, if so desired. The said main motor 387 may however be one of the figures of this specification or related motor with overrunning means for allowing main propeller 388 an auto rotation or overspeed relatively to the motor 387. Main motor 387 may be pivotably borne in holder(s) 384 and the motor may have respective bearing portions 385 to be pivotably borne in said holding portion(s) 384. An actuator 386 may be associated to the body 380 and to the motor 387 for inclining the axis of said motor 387.

Thus, for vertical take off the axis of main motor 387 may be pivoted into the vertical position, while tail motor 396 may be pivoted into a positional angle and be driven with a rotary velocity to just balance the reaction torque of the main propeller 388 in order, that the craft starts vertically upwards without move of the tail. For turning action the tail motor 396 may be revolved faster or less fast. Speeds of motors are controlled by the rate of flow supplied from the respective pumps or fluid flows supply means in the craft. For forward flight the main motor 387 may be inclined forward. For driving the craft in autorotation or as a gyrocopter, the tail motor 396 may be pivoted into a forward drive position with its axis substantially parallel to the axis of the tail. All power may then be send into tail motor 396 for driving the craft forward with good speed, whereby the overrunning means of motor 387 may allow the over rotational speed or auto-rotation or gyrocopter rotation of main propeller 388. Inclination actuator 385 may be remote controlled by the pilot for desired autorotation, gyrocopter flight, vertical flight and like.

Figure 27:
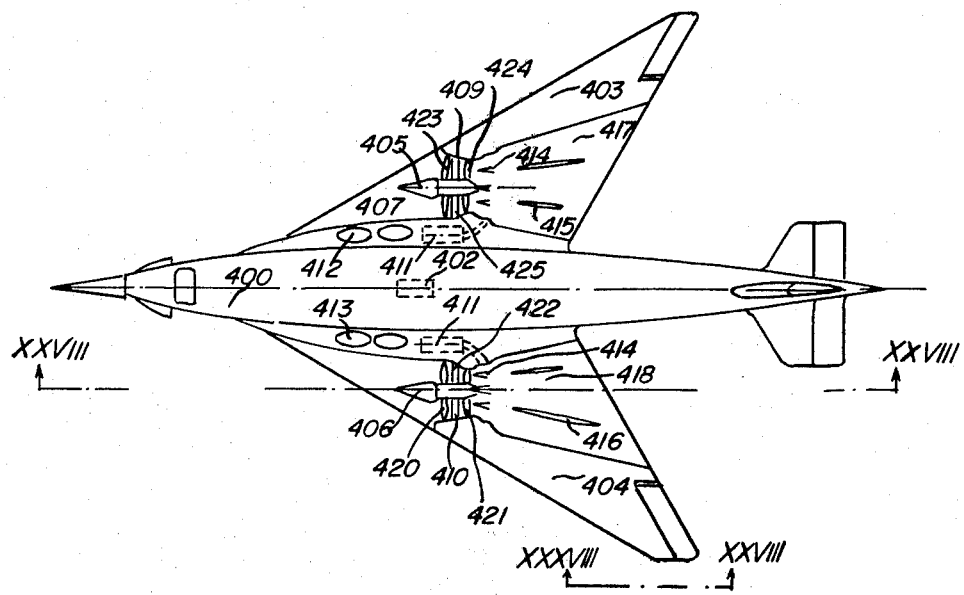
FIG. 27 shows another vehicle partially in section partially from top.
Figure 28:
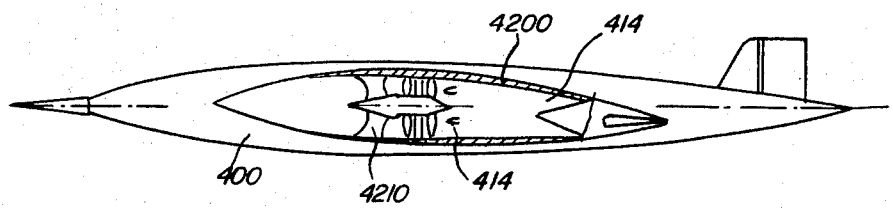
FIG. 28 is a sectional view through FIG. 27 along lines XXVIII—XXVIII.

FIGS. 27 and 28 demonstrate a subsonic or supersonic propulsion system and said propulsion system assembled by way of example into an aircraft. Fluid motors 405 and 406 are driven by respective fluid flows which may be supplied from supply means 402, which may include a power plant for driving the fluid flow supply means thereof. If more than one fluid motors are applied it is suitable to synchronize their rotary velocity by respective multi flow pump means of equal or proportionate rate of flow is separated flows. Fluid motors 405 and 406 drive respective propellers, rotors, or axial—or radial—compressors of dynamic fluid compressing or speeding blades or like. Rotors 420,421 or 423,424 may have respective guide blades or holders 410 or 409 between them or before or behind them. The whole assembly may be in ducted housing for forming on intake or intakes 407 and/or 408 and exit diffusors or exits 417 and/or 418. Fuel injection or supply nozzles 414 may be behind the mentioned rotors, which form the compression stage. Fuel is supplied through the nozzles 414 by fuel injection—or supply means 411. Equalness of rate of supply is desired in case of more than one propulsion assembly. Guide means 414,416 may act to direct the exit flows into desired directions or portions of the exit or exit diffusor. FIG. 28 shows the same as FIG. 27 however in the sectional view of line XXVIII—XXVIII with partial view along the other line XXVIII—XXVIII. Assembly housing is shown by 4200 and the guide or holding member by 4210. Referential 419 shows a constrictional section of the wing for streamlined exit flow out of the wing, if the propulsion unit is assembled in a wing of an aircraft. The aircraft has body 400 and wings 403 and 404. Supply intakes 412,413 may be provided to take in additional air for leading it to the fuel injection devices 411 for pre-mixture of air with fuel or better burning or gasation of fuel or for cooling purposes to be led to the desired places, locations and devices.

Thus, the propulsion system of this embodiment of the invention does not need any turbines to drive the compressor stages as in Jet-engines. Thereby the heat of blades of turbines of Jet engines does not occure. Consequently the propulsion system of this invention is not limited by heat on turbine blades. Thus, it can be utilized for very high suppersonic speeds as in fighter planes or in passanger planes of times the speed of the present Concorde plane. In addition the pilot of a multi-propulsion unit plane does not need to take care any more of the rotary velocity of the propulsion units. Because their rotary velocities can be synchronized by the multi flow supply devices of my inventions. Thus, the pilot needs only one single control handle for controlling the speed of all of his propulsion units. The fluid motors and the compressor blades are in relatively cool air and, thus, the propulsion unit(s) of the invention does not have cooling problems as present Jet-engines have. The compression stage combines at high flight speed with ram-air whereby the propulsion unit may become a combined propulsion-ram-air unit. Efficiency will thus be good at low aircraft speed as well as at times of mach speed, because at low speed of forced air compression takes care of good efficiency and and super-mach speeds of the aircraft the ram air effect adds to best efficiency of the aircraft propulsion.

Figure 29:
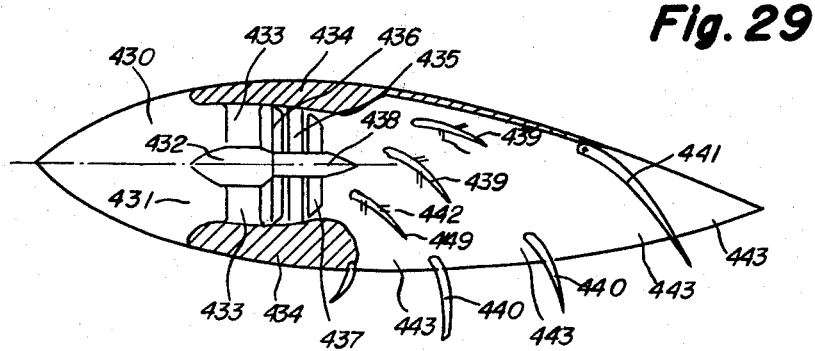
FIG. 29 is a longitudinal sectional view through another device.

FIG. 29 shows a similar propulsion unit as in FIGS. 28 and 28. Body housing 434 contains holders and guides 433 and 435 for holding fluid motor assembly 432 and for guiding the air during compression between or before or after rotor blades 436,437 which are driven by fluid motor assembly 432. Body 430 may be a wing of an aircraft. Intake 431 is provided before the compressor stage 432,433, 436,437, 435 and behind said compression stage is the combustion chamber with fuel injectors or suppliers 442 and the exit(s) 443. The specific of this embodiment of the invention is, that the exit is associated to exit flow guides 439 and 440 which are adjustable to guide the driving exit flow either backward or vertically downwards or in any inclined direction therebetween.

In FIG. 29 the exit flow guides 439 and 440 are shown in the position for directing the exit flow downwards for vertical flight, take off or landing. By pivoting them backward and/or upward, the exit flow may be directed backwards for forward drive of the craft in high speed flight or for other purposes. The exit guides 439 may bear the fuel or fuel-air injectors 442. The pivoting of the exit guides 439 and/or 440 is self-explanatory, because this is only a pure mechanical matter and its description can be spared here in this specification.

Figure 30:
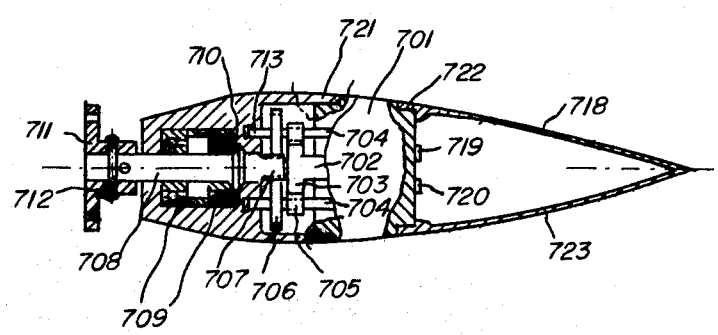
FIG. 30 is a partially view from a side and partially a longitudinal sectional view through an assembly of the invention.

FIG. 30 is a partially sectional longitudinal view through a fluid-motor assembly of the invention which includes a pre-assembly. The pre-assembly is either a speed up or a speed down gear means. Fluid motors of the inventions of applicant are of very high efficiency at low speed and at medail speeds of some thousand rpm. However, fluid motors, and especially hydraulic fluid motors loose as more efficiency as higher the rotary velocity of the rotor becomes. Quite surely the design of the fluid motor and its material can make the motor efficient at high rotary velocities, whereby the fluid motor can become defined as a high speed fluid motor. However, for the utilization in several applications, for example in the assemblies of FIGS. 27 to 29 or in ducted fan driven aircraft of boats, the efficiency losses due to high rotar velocity are sever. In such application cases it is suitable and good to set a speed up gear, like a mechanical gear before the motor, which means between the shaft of the motor and the rotary member to be driven. Thus, fluid motor 701 is provided with flanges 721 and/or 722. A streamlined rear portion 718 may be assembled to restrict drag in air and may have an opening 723 for setting of fluid lines to parts 719 and 720. In the front body the propeller or other shaft 708 may be borne in bearings 709, may have a thrust holder 710 and fasteners 711 and 712. Motor shaft 702 may carry a first gear 703 for associating into medial first gear 705, while first and second medial gears 705 and 706 may be associated to medial 704 and said shaft 704 may be borne in bearings 713. Medial gears 705 and 706 may rotate in unison. Front shaft or exit shaft 708 may carry an end gear 707 which engages into gear or gears 706. Instead of providing the gear set as shown in the figure, any other suitable number of gears, different number of teethes of gears and any other suitable gear arrangement or speed transmission means may be set. The gear means between motor 701 and outgoing shaft 708 will mostly be a speed up gear, but it can also be used as a slow down gear, in case if so desired. Thrust holder 710 can also be set opposite and it may carry the thrust of a propeller or like.

In FIG. 31 another embodiment of the invention is demonstrated. It shows how a plurality of pumps can be effectively driven by an engine or a plurality of engines. The assembly of this figure eliminates friction in pumps and thereby increases the efficiency of the pumps. Because it balances the axial thrust, which is appearant in axial piston pumps or radial chamber pumps with thrusting control bodies on the opposite end of the rotor of the pumps. Thus, according to this embodiment of the invention, the shafts 742 and 743 are set head to head in order to balance their axial forces against each other. Said shafts may also form an integral shaft for two opposite located and directed pumps. Engine cylinders are shown by 731 and 732 and the gases in them drive a primary gear 733 which engages and drives a secondary gear 734. Instead of gears sometimes chains or other power transfer means are used. Pump shafts 742 and 743 are borne in bearings 735 in medial housing portion 738. Pumps 736 and 737 are located in housing 730 or attached thereto and they have in the known manner entrance and exit ports 738 to 741. Instead of one single engine a plurality of engines may engage to drive the primary gear means 733. For example two crankshafts 747 and 747 may engage into the common primary gear 733. The reaction forces of the primary gear may partially balance out the thrust of the pistons of the pumps onto the secondary gear 734 in FIG. 31.

In FIG. 32 is demonstrated, that instead of gears 733 and 734 a chain drive may be used. In such case the secondary chain gear is subjected to traction towards the engine instead of the opposite reaction at gears 733 and 734. Therefore, in FIG. 32 the pumps are inclined in an opposite angle. The thrust of the pistons of pumps 736 and 737 acts now contrary to the direction of traction of the chain on the secondary chain gear. Thereby again some forces are balancing each other, so, that the remaining forces in the bearings 735 are again reduced, whereby the efficiency and power of the whole assembly increases. The main increase in efficiency and power is however due to the opposite thrust of the pistons of the pumps 736 and 736 onto the shafts 742 and 743.

These forces are balanced by setting shaft head against shaft head, so, that the one shaft balances the oppositional directed forces of the other shaft. Since the shaft heads are relatively to each other not moving, the balancing of forces appears in the embodiment of the invention without any loses. Consequently the increase in efficiency and in power due to the embodiment of the invention is very considerable and the life time of the bearings is also increased.

In the embodiment of FIGS. 34 and 35 a body structure is demonstrated, which consists of fluid lines, likely thin walled steel titanium or other pipes. The feature of this embodiment of the invention is, that the fluid lines are building the aircraft structure at least partially, so, that a further structure may be spared. That safes weight and drag during flight. It makes the vehicles less expensive, more light and more speedy in flight. The embodiment shows, that, when at least three fluid lines are used, for example two delivery fluid lines and one or more back fluid lines, the arrangement of the fluid lines can be done in such a way, that the fluid lines alone with a few stabilizing ribs between them can provide a complete holding portion for holding a propeller motor and thereby the respective propeller. Moreover the embodiment of these figures demonstrates, that the holders, built by stable fluid pipes, can be supplied as separately transportable members, which may at will be bolted or fastened to aircraft, helicopters, gyrocopters or like and whereonto the fluid motors can be respectively fastened. In a preferred example of the embodiment, demonstrated in FIGS. 34 and 35 delivery fluid lines 750 and 751 can be fastened or are fastened to a flange means 762. The return fluid line(s) 752 can be fastened or is fastened, for example welded, to the same flange 762. Said flange may have fastening means, for example bores 769 for fastening of the respective fluid motor to said flange 762. On the other end the fluid lines may have connecting means, for example threads 754 or 755 for connection to flexible fluid line hoses or for connection to the pumps or other fluid line extensions. Ribs 753 may be fastened to either of the fluid lines for providing a stable structure. On the other ends of the said fluid lines, the fasteners 758 or 759 may be provided and they may have further fasteners 760 or 761. The feature of the fasteners 758 and 759 is, that they are distanced from the respective fluid line end and extend substantially parallel to the respective fluid line. Thereby it is possible, to maintain straight and unbend fluid lines 750 to 752. This is very convenient, because straight fluid lines can easily be cleaned out inside. That is important for a safe operation in order, that no durty matter can enter into the pumps or motors. Under these circumstances it is possible to weld the flanges, fasteners, ribs and like onto the fluid lines and thereafter clean the inside of the straight fluid lines from welding dust and like. Fasteners 760 and 761 are provided in order to fasten to sets respectively together or to fasten the fluid line arrangement to the body of the vehicle.

In FIG. 36 a combination set for the combination of two or more delivery flows into a single motor entrance port is demonstrated and shown in a longitudinal sectional view. It makes it possible to set the multiple delivery pipe set of FIGS. 34 and 35 onto a conventional fluid motor. Housing 770 has the entrance ports 775 and 776 formed matching with the exit ports 757 and 768 of the fluid line structure of FIGS. 34 and 35. Fasteners or bores 796 in housing 770 are preferedly also matching with the respective bores 769 in flange 762 of the fluid line structure and also with respective bores or threads in the respective fluid motor. Exit port 777 matches with the respective entrance port of the respective fluid motor. One-way flow valves, often called check-valves 771 and 772 are provided to the entrance ports 775 and 776 for opening, when delivery fluid comes from the fluid lines 750 and 751 and for closing, when no flow comes. Thus, when one of the fluid lines 750 or 751 brakes, the respective one way valve 775 or 776 remains closed, so, that no fluid from the remaining healthy fluid line can escape, and thus, the motor can be still supplied with fluid and drive the respective propeller, even when one of the delivery fluid lines 750 or 752 brakes. This arrangement provides an effective safety to any vehicle, whereto the arrangement of the invention is applied. Spring means 773 and 774 are provided to assure the closing of the one way valves 771 and/or 772. The arrangement of this FIG. 36 may be a separated part or it may be a portion of the fluid line structure of FIGS. 34 and 35 or it may be a portion of a respective fluid motor.

In FIG. 37 is in a view from above simplifiedly shown and demonstrated, how the structures of FIGS. 34 and 35 each separatedly or combined together may be fastened to a vehicle's body, thereby forming a complete craft. Body 780 may have fastening means, for example thrads or bores for fastening of the respective flanges 760, 761 to body 780. Shown are six fluid pipe structures 750 and siz fluid motors 781 to 787 attached to fluid line structures 750. Propeller blade circles 787 demonstrate, how for example a complete helicopter or gyrocopter may be assembled from the parts demonstrated in this specification. Instead of six units, there may be two, one, four or any plurality depending on design of the craft. In FIG. 34 is demonstrated how two pipe line structures 750 might be fastened symmetrically to each other to form a two propeller craft.

Figure 38:
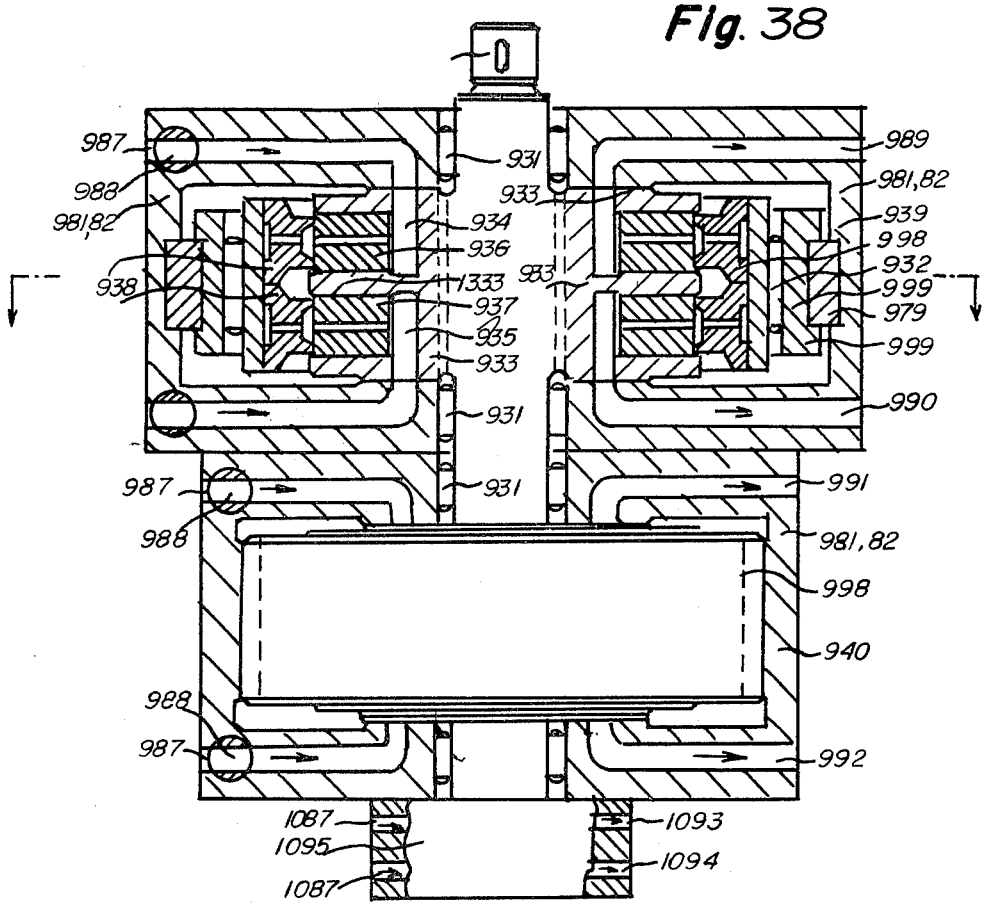
FIG. 38 is a sectional view through a pump means of the invention.
Figure 39:
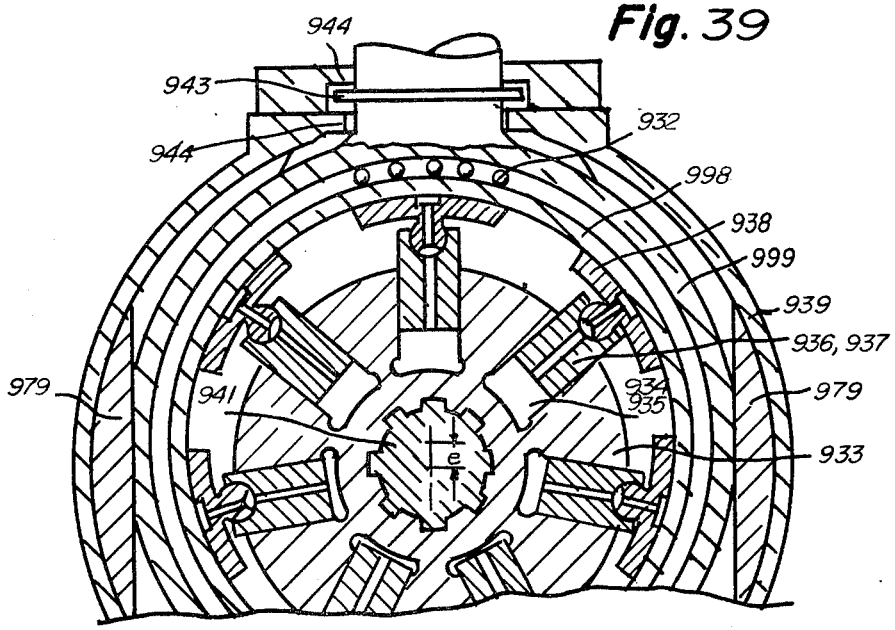
FIG. 39 is a sectional view through FIG. 42 along line IVII—IVII.

In FIGS. 38 and 39, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 939 and 940 are flanged to each other, and the shaft 941 carrying the rotors is rotatably mounted in bearings 931 provided in both of the housings. Each of the housings encloses one rotor 933, and each rotor 933 is formed with two groups of delivery chambers or cylinders 934 and 935 in which pistons 936 and 937 are reciprocated by means of a reaction ring 998 with interposed piston shoes 938. A stroke adjusting slide block 999 surrounding the reaction ring 998 with an interposed bearing 932 is displaceable, within certain limits, along guides 979 whereby the stroke of the pistons may be varied to a limited extent.

Each of the mentioned rotors 933 has a medial uninterrupted body portion 1333 between the respective two neighbouring working chamber groups 934 and 935 for the separation of the respective working chamber groups 934 and 935 from each other. Thereby the groups of cylinders 934 and 935 are completely separated from each other, and each group has its own fluid inlet passage 987 and fluid outlet passage 989 to 992 respectively. The pressure fluid inlet and outlet passages cannot communicate with each other. Flow volume regulators 988 may be mounted in the inlet passages in case that the stroke adjusting slide block 979, 999 is not provided. The other housing 940 encloses the same members, i.e., the rotor block with groups of cylinders, pistons, piston shoes, and only the reaction ring 998 is not adjustable. In the figure, this reaction ring 998 is shown in an elevational view. The part mounted in the housing 940 has its own inlet passages 987, if necessary, with flow regulators 988 mounted therein and two mutually separated and non-communicating fluid outlet passages 991 and 992. A priming device 1095 having inlets 1087 and two separate outlets 1093 and 1094 may be provided at the end of the pump. In this case, the outlets 1093 and 1094 lead to the inlets of the main pump. The outlet passages 990, 991 and 992 are connected each to one of the hydraulic motors of the vehicle through pressure fluid lines. Owing to this arrangement, a fixed proportionality in particular equality, of the rates of flow in all of the four circuits is assured, with two of the flows being jointly adjustable.

Figure 33:
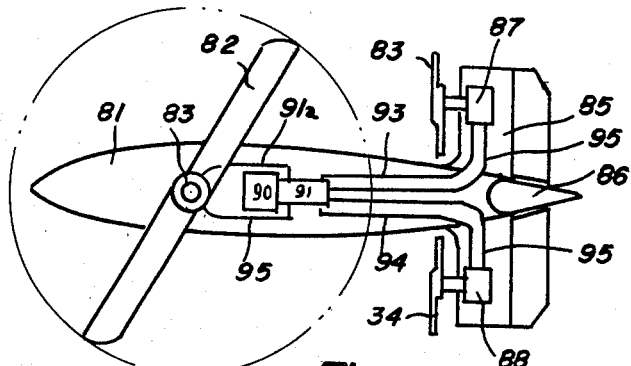
FIG. 33 is a view from above on another aircraft of the invention.

In FIG. 33 the aircraft has a body 81 carries a main fluid motor 89, which in turn carries a main rotor 82, a side-control means 86 and a rear portion 85 as well as a power plant 90, a pump 91 and fluid lines.

Power plant 90 drives pump 91. From pump 91 one pressure delivery fluid line 93 extends to fluid motor 87 to drive the same and the propeller 83 driven by said motor. Another fluid pressure delivery line 94 extends also from pump 90, but to fluid motor 88 to drive the same and thereby the propeller 84, which is fastened to the rotary shaft of fluid motor 88. The fluid returns with less pressure from the motors 87 and 88 through the return fluid line 95 directly or indirectly to the pump 91.

Figure 40:
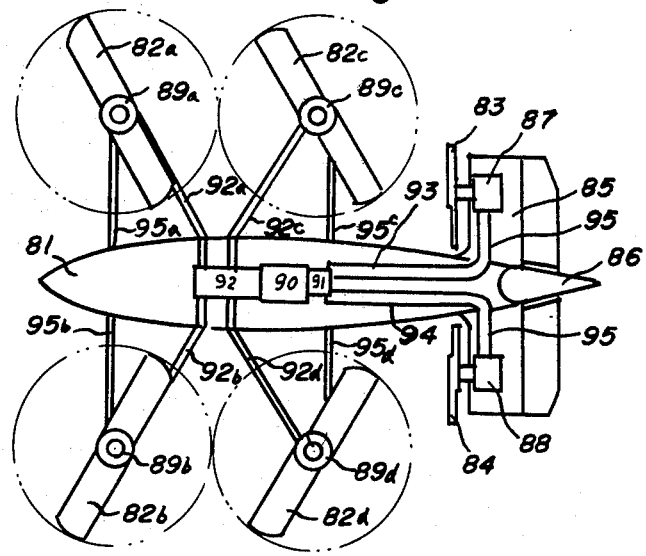
FIG. 40 is a view upon still another aircraft of the invention.
Figure 7:
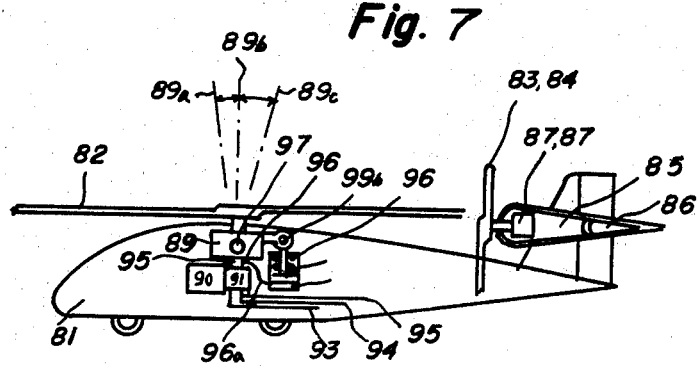
FIG. 7 is a view from a side to another aircraft of the invention.

In FIGS. 40 and 7 the arrangement of the rear portion 85 with the fluid motors and propellers thereon is similar to that of FIG. 33 as above described. In FIG. 40 pump 91 takes over the delivery of the flows 93,94, of pump 91 of FIG. 33. Power plant 90 drives pump 91 in FIG. 7 and power plant 90 drives pumps 92 and 91 in FIG. 40.

Delivery line 91-a leads fluid under pressure from pump 91 in FIG. 33 to main fluid motor 83 in the figure and the return line 95 returns the low pressure fluid to the pump 91. Main fluid motor 89 drives the main rotor or propeller 82.

In FIG. 40 the pump 92 is a multi-flow pump to supply four, six, eight or more flows of fluid under pressure to drive a corresponding number of fluid motors and propellers thereon. Shown in FIG. 40 are four fluid delivery pressure lines 92a to 92d, four main fluid motors 89a to 89d and four main rotors 82a to 82d. But instead of setting four motors and propellers it is often useful to set six or eight motors and propellers. Inventor prefers to set propeller-pairs, whereof each one propeller is on the right side of the body and the other propeller of the same pair is on the left side of body 81. Propellers of the same propeller-pair revolve with oppositional rotary direction. That is obtained by the respective port-connection of the respective fluid motors to the respective delivery fluid line. Fluid line 92a drives motor 89a and propeller 82a. Fluid line 92b drives motor 98b and propeller 82b. Fluid line 92c drives motor 89c and propeller 82c and fluid line 92d drives motor 89d and propeller 82d. The rate of flow of fluid in said delivery fluid lines 92a to d is equal in all of said fluidlines with previous nummeral 92. The fluid is returned under little pressure from said fluid motors through return fluid lines 95a to d directly or indirectly to pump 92.

In FIG. 7 the pump 91 supplies an additional flow in addition to the flows 93 and 94 to the rear motors. This additional flow is fluid pressure flow 96 through fluid line 96 to main fluid motor 89. The fluid returns after use from motor 89 through fluid line 95 to pump 91. Fluid motor 89 is borne in holding members by motor arms 97, whereby the motor 89 can pivot with its axis between positions 89a to 89c. A twin fluid line 96a extends from high pressure fluid delivery fluid line 96 to a chamber 98. In chamber 98 a member 99 is reciprocably mounted and closes the chamber 98 in one direction. A spring means presses said member 99 towards the bottom of chamber 98. A connection member extends from member 99 to a connection portion 99b of the fluid motor 89.

The craft shown in FIG. 33 may either operate as a helicopter or it may operate as a gyrocopter. For example, when the main motor 89 drives the main rotor 82, the craft acts as a helicopter. Propellers 83 and 84 may drive the helicopter forward. When however the motor 89 is built as one or the other motors of this invention, the delivery of fluid from the pump 91 to the main motor 89 can be stopped. This may be done, when the craft already has a forward motion of anough speed to allow either autorotation or gyrocopter-type rotation of main rotor 82. The propellers 83 and 84 will then continue to drive the craft forward, whereby the main rotor 82 maintains its revolutions as the rotor of a gyrocopter. The one way coupling means then overruns the small or no motion of the shaft of motor 89. Motor 89 may then come to a standstill. The flight of the craft may continue as gyrocopter. Motor 89 may be energized by supply of pressure fluid again for landing. It is left up to the pilot in this craft to fly either as gyrocopter without fluid power supplied to the main motor 89 and to propeller 82 or to fly the craft as helicopter with supply of drive fluid to main motor 89. If only one of both said systems of flying is wanted, the customer may order the craft of FIG. 33 for either helicopter-like or gyrocopter-like, whereby eithe the main motor 89 or the overrun-coupling may be spared.

The craft demonstrated in FIG. 40 may have similar motors 89a to d and propellers 82a to d, whereby each of said motors may be similar to the motor of FIG. 33. So may be the propellers. With the exception that the propellers of same propeller-pairs revolve in opposite direction.

Thus, the craft of FIG. 40 may so as the craft of FIG. 33 fly either as a helicopter or as a gyrocopter, depending, whether the rotors 82a to d are driven by the motors 89a to d or not.

The feature of the craft of FIG. 40 is in addition to the features of the craft of FIG. 33, that the craft of FIG. 40 can carry very heavy load. Because, according to the "Handbook of my flight-technology" of the inventor, a plurality of propellers of equal size can carry more load with the same amount of total power, than a single propeller can. It is true, that the hydraulic drive of the invention has some losses. But it is not true, that thereby the multiple propellers would carry less load at same power, than a single propeller of same size, driven by equal power would, when the single propeller would be driven without transmission losses. True is, that the multiple propellers carry at same power more load than a single propeller, even when the multi-flow drive has losses. Only a helicopter with a single propeller will have a carrying capacity loss by the losses of a fluid drive. But not a multi-propeller arrangement, as in inventor's patents or patent-applications.

This appears from the following:

The impuls by a propeller to the fluid stream or the lift of the propeller with vertical axis at level is:

$$I = mV_1 = 2\rho F V_1^2 \tag{1}$$

The kinetical energy in the airstream after the propeller is:

$$E_k = \frac{m}{2}(2V_1)^2 = 2\rho F V_1^3 = N \tag{2}$$

Equation (2) can be transformed to:

$$V_1 = \sqrt[3]{N/2\rho F} \tag{3}$$

and thereafter I insert the "V1" of equation (3) into equation (1) as follows:

$$I = S = H = 2\rho F \left[ \sqrt[3]{N/2\rho F} \right]^2 \tag{4}$$

which may be transformed to:

$$I = S = H = 2\rho F \sqrt[3]{N/2\rho F} \sqrt[3]{N/2\rho F} \tag{5}$$

or to:

$$S^3 = H^3 = I^3 = 8\rho^3 F^3 \frac{N}{2\rho F} \frac{N}{2\rho F} \tag{6}$$

or to:

$$S^3 = H^3 = I^3 = \frac{8}{4}\rho F N \tag{7}$$

or to:

$$S = H = \sqrt[3]{2\rho F N^2} \tag{8}$$

or to:

$$N \sqrt{S^3/2\rho F} \tag{9}$$

In the above equations I use:
I = Impuls = Lift   H = Thrust   S = Kg.
V1 = airflow velocity in the propeller-circle, in m/s
m = mass of air grasped by the propeller in Kg/9,81.
F = cross-sectional area of the propeller-circle in m²
$\rho$ = density or air = Kg s²/m⁴; and
N = $E_k$ = power required in Kgm/s = kinetical energy, I now introduce the efficiency "$\eta$" of the hydraulic drive. And I introduce the number of propellers "M" whereby all propellers have equal diameters and shapes, with the exception, that each 2nd propeller of the same propeller pair revolves oppoitionally.

With these knowledges I introduce the efficiency and the number of propellers into equation (9) and obtain:

$$S = H = M \sqrt[3]{2\rho F \left(\frac{\eta N}{M}\right)^2} \tag{10}$$

For equal power and equal size of propellers as explained above, in equal air, the values "2$\rho$FN" are equal and they can be taken out of equation (10). I now obtain equation (11), which reads as follows:

$$F_{TL} = M \sqrt[3]{\frac{\eta^2}{M^2}} \tag{11}$$

and wherein "Ftl" is a comparison factor which directly gives a universal comparison of lifting capacity for numbers of equal propellers over the transmission efficiency. See FIG. 8.

Figure 8:
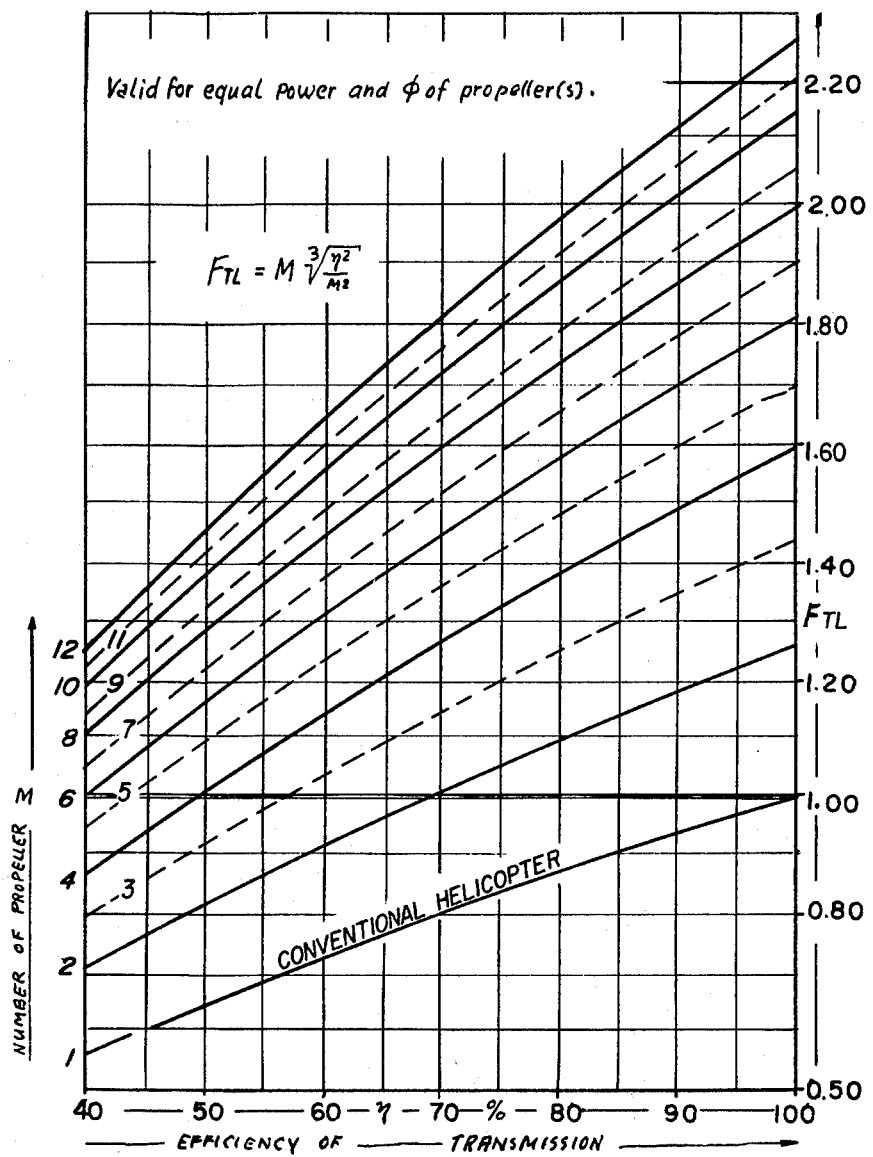
FIG. 8 is a schematic showing mathematical values.

Therefrom it can be seen, that even with 20 to 30 percent of losses in the hydraulic drive system, the plurality of propellers of FIG. 40 lift until 2 times more, than a single propeller craft as that of FIG. 33 or as the conventional helicopter of equal power and propeller size. Equation (11) with factor "Ftl" is shown in FIG. 8. A craft with four Bensen Gyrocopter propellers in FIG. 40 can carry about 2000 lbs gross and about 1100 lbs net.

And, FIG. 8 shows, that even much more economy can be obtained with more than 4 propellers. For example with eight propellers in four propeller-pairs the equal installation of power will carry almost twice as much as equal power would carry with a single propeller as in the conventional helicopter. Even, when the fluid drive of the invention has several losses.

The feature of the craft of FIG. 7 is, that it may fly as a helicopter with high speed, but that in addition it will automatically bring the craft into gyro-copter-like operation or into auto-rotation, when the power supply to the main motor 89 would fail. Therefrom a great safety of the craft is obtained. Because the pilot does not need any more to switch to auto-rotation, when the said power supply fails. He will just continue to fly as gyrocopter or in case of total power failure just sink slowly down as a gyrocopter does, even, when the pilot sleeps or does nothing at all.

This safety arrangement is obtained as follows: High pressure fluid from fluid line 96 through fluid twin line 96a presses fluid into chamber 98 and thereby presses member 99 upwards. Over connections 99a and 99b the main motor 89 pivots around holding axis 97 into axis position 89a which is the helicopter-flight position. When the fluid supply in line 96 fails, the spring means 99a forces the member 99 downward and thereby pivots the propeller axis either into position 89b or 89c, depending on the actual design. Position 89b is the auto-rotation position of the helicopter and position 89c is the gyrocopter-type flying position. Thus, fluid pressure automatically makes helicopter-flight position and fluid pressure failure automatically provides either auto%-rotation landing or gyrocopter-like flight or landing.

Instead of waiting for the automatical action, it would also be possible to incorporate a manual control for switch between the described positions and principles of flying.

Figure 41:
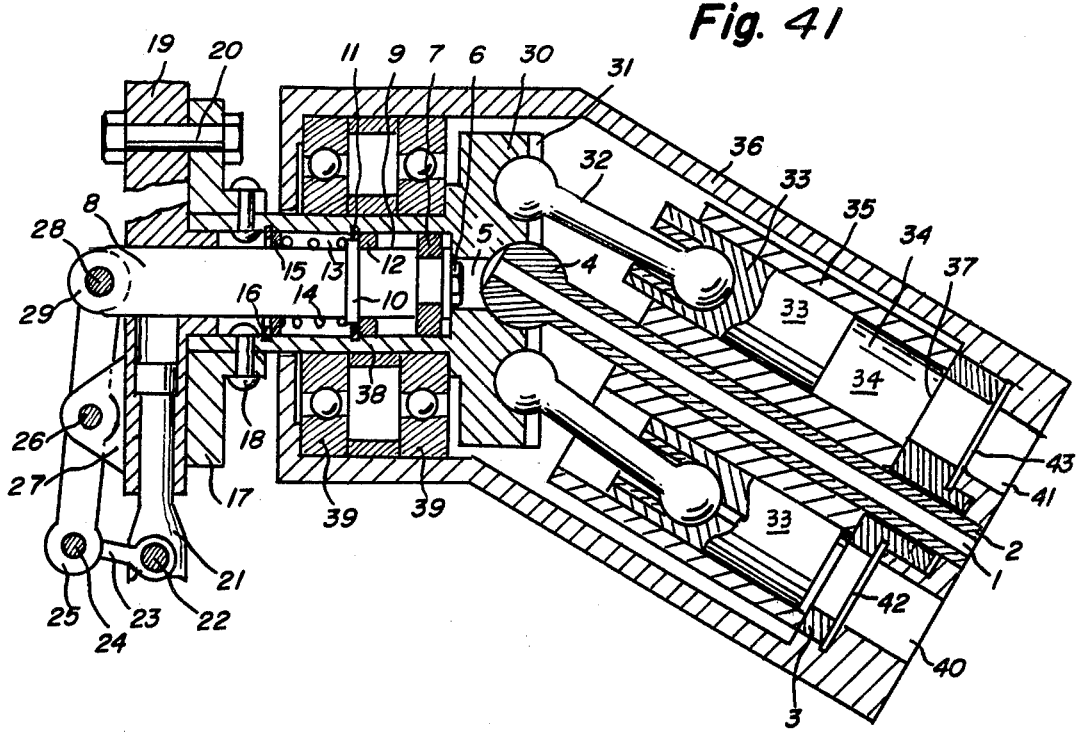
FIG. 41 is a sectional view through another fluid motor of the invention.

In FIG. 41 an achsial piston type fluid motor is shown. It has the commonly known following parts:

Housing 36 has a control face 37 whereon the rotor 35 revolves. Thereby the flow of fluid from one part 40 or 41 through control faces 37 into the cylinders 34 is controlled and so is the flow out of said cylinders through said control faces to the other of said ports. Control face 37 consists actually of a control-mirror, built by the rotary and stationary control faces 37. Pistons 33 move in the cylinders and transfer the fluid pressure over connecting rods 32 into the driven shaft 30. Shaft 30 is borne and revolving in bearings 39 of housing 36. A medial shaft 2 with connection ball 4 in shaft 30 concentrates the rotor in the housing 36. So far the motor is well known from the former art. Also known from former art, however from U.S. Pat. No. 3,743,924 of the inventor, is the possibility to provide the stationary control face 37 on a control body 3, which may be pressed by fluid pressure in chamber 42 or 43 against the rotary control face 37 of the rotor 35. The application of control body 3 is however not absolutely necessary. The rotor may also be pressed against the stationary control face 37 if said control face is stationary made on the back-cover of housing 36, as known in the art.

According to the invention, a control-flow fluid line 1 is led through the rear portion of the housing 36, through the medial shaft 2, through the control face-set 37, through the connection portion 4 and through a portion of driven shaft 30 into a respective chamber 7 in portion 38 of driven shaft 30. The driven portion 38 of driven shaft 30 is hollow and contains the thrust chamber 7, whereinto the described control flow of the invention is led. In chamber 7 a control-piston 8 is reciprocably located. It is pressed towards the bottom of chamber 7 by spring means 14. Spring means 14 is located in chamber-portion 13 and held by retainer members 15-16 in chamber portion 13 in shaft portion 38 to be pressing against the neck 10 of control piston 8. Thereby control piston 8 is pressed towards the bottom of chamber 7. Chamber 7 is sealed by piston 12, which is held in neck 10 and which is reciprocable together with control piston 8. When the control-flow of the invention is led into chamber 7, the pressure in the control flow 1 presses the pistons 8-10-12 away from the bottom of chamber 7 and thereby compresses spring means 14.

A flange 17 may be fastened by fasteners 18 to the hollow shaft portion 38. Flange 17 may carry a propeller portion 19, which may be fastened to flange 17 by fasteners 20.

Control piston 8 may extend into or through the propeller-portion 19 and may end with a connecting portion 28 to connect a transmission member 25 by connector 29 to connecting portion 28. Propeller-portion 19 may carry at least one bearing portion 27 to bear therein a bearing pin 26 to bear pivotably thereby the transmission-arm 25. Propeller-blade or blades 21 may be pivotably borne in propeller portion 19. Propeller blades 21 may have a connection member 22 to carry thereon another transmission-arm 23, which on the other end is connected to the other end of arm 25 by connector means 24.

Thus, when no pressure enters as control flow into chamber 7, the spring 14 presses the propeller blades 21 into the position of small angle of attack or into the auto-rotation position. When pressure in fluid in the control flow 1 of the invention enters into chamber 7, the control piston 8 is moved outwards and the described connection means and transmission means then press the propeller blades 21 into a position of an higher angle of attack. The propeller can now be utilized as a helicopter propeller or as an aircraft propeller to drive the aircraft forward.

The setting of the angle of attack of the propeller blades by the control flow of the invention through the fluid motor of FIG. 47 and of some other of the figures of the specification can be done steplessly variable. A higher pressure in the fluid flow will compress the spring 14 more than a lower pressure would do and consequently the angle of attack of the propeller blade will steplessly variable depend on the stepless variable pressure in the control flow 1 of the invention.

The upper portion of the propeller portion 19 may carry another propeller blade. Thus, there may be a plurality of propeller-blades 21 be provided and be borne by or on propeller-portion 19. All propeller blades may be connected similarily as that on the bottom of the figure to the control-piston 8 and thereby to the common control flow 1 of the invention. Thereby the adjustment of angles of attack of all propeller blades will act in unison.

Instead of utilizing the control flow of the invention for the adjustment of the angle of attack of a propeller, it might also be used for arresting purposes or for other purposes, as demonstrated in other figures of the invention. Actual design may reverse directions of actions.

Figure 42:
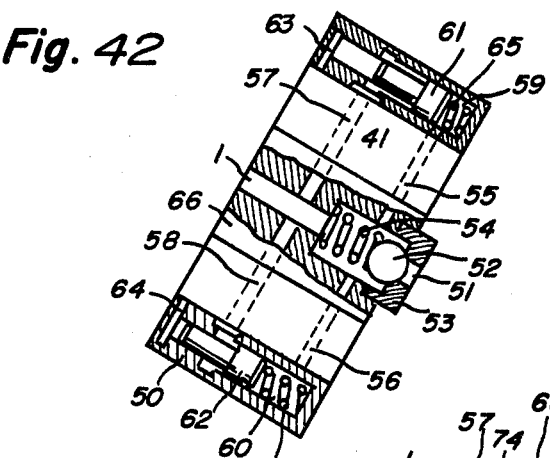
FIG. 42 is a sectional view through a fluid motor portion or adupter.

FIG. 42 contains a control means which may be either built into a cover or housing of a fluid motor or which may be built into an adupter set-housing 50. Such adupter housing 50 can be flanged onto the end of a respective motor, for example onto the right end of FIG. 41.

The feature of the control device of FIG. 42 is, that the control-flow passage 1 of the fluid motor will automatically be communicated to the driving high pressure fluid line to the motor as long as no specifically relatively higher pressure is send intentionally to control fluid line 1. Housing portion 50 contains at least one control-cylinder 59 and/or 60. One end of such control cylinder may be communicated to fluid port or passage 41, for example by communication passage 63. The other cylinder 60 may be connected by passage 64 on one end of said cylinder 60 to port or passage 42 of the motor, if such cylinder 60 is provided. The control-cylinder(s) 59,60 contain(s) a control-piston 61 or 62. The other end of the respective control cylinder 59 or 60 contains a spring means 65 in order to press the respective control piston 61 or 62 towards the other end of the control cylinder 59 or 60. From the medial cylinder portion of control cylinder(s) 59 or 60 a respective passage 57 or 58 extends bypassing passage 41 or 42 through a portion of housing portion 50 to the control flow fluid line 1 of the invention.

A control flow connection 51 extends from a closure member 53. When a control flow of higher pressure shall be intentionally send to the control means of the motor, such higher pressure control flow will be send to connection port 51. The one-way valve 52 is pressed by spring means 54 into a closing position on closure member 53. Thereby control flow line 1 is closed toward control flow port 51.

On the spring-side end of the respective control cylinder 59 or 60 a respective other passage 55 or 56 extends through another portion of housing portion 50 bypassing the respective ports or passages 41 or 42 into the control flow fluid passage 1.

The springs 65 are so strong, that they are able to move the respective piston 61 or 62 into a position to close the communication between passages 63 and 67 or 64 and 58 when low pressure is acting in the respective fluid port 41 or 42. Such low-pressure is present commonly in the return fluid port from the motor.

The springs 65 are however not strong enough to resist the pressure in the high pressure fluid delivery port or passage 41 or 42. Thus, the port or passage 41 or 42 which is communicated to the respective cylinder 59 or 60 sends high pressure delivery fluid into the one end of the respective cylinder 59 or 60 and thereby presses the respective piston 61 or 61 against the respective spring 65, compresses the respective spring 65 and thereby opens the communication between passages 63 and 57 or between 64 and 58, while the low-pressure connected passage 63 or 64 remains dis-communicated from the respective passage 57 or 58 and thereby closed to the respective passage 57 or 58. Thus, the high pressure fluid from the high pressure fluid delivery line to the respective motor is led through port or passage 41 or 42 into the control flow fluid line 1 of the respective fluid motor. The size of pressure in the delivery fluid thereby controls the size of angle of attack of the associated propeller blades. Thus, a higher pressure in the delivery fluid line will automatically stiffen the angle of attack of the propeller blades. This is specially convenient for aircraft and helicopters, because a higher pressure is present when a higher power is used. The work of the pilot to increase the angle of attack of the propeller blades, when he intends to fly or climb faster with higher power is now, according to the invention, take over by the delivery pressure in the delivery fluid flow of the invention. The pilot is spared from this work and the attention to it.

When it is desired to rise the angle of attack of the propeller blades still higher, for example by addition of an additional power boost engine, a control flow fluid pressure of higher pressure than in the delivery fluid line 41 or 42 is led by pilot's or other control-action to fluid line port 51. This higher pressure thereby opens valve 52 against the pressure of the delivery fluid line 41 or 42. The pressure of control flow 51 now enters into both cylinder spring ends 59 and 60 and closes both communications 63-57 and 64-58 by moving both pistons 61 and 62 into the closing position. Thereby the fluid ports or passages 41 and 42 are discommunicated or closed from the main fluid flows 41 and 42 and the control of the angle of attack of the propeller blades or of any other control member controlled by fluid line 1 is now controlled by the fluid pressure in pressure control line 51.

Thus, as long as the pressure in fluid in line 51 is higher than the pressure in the delivery fluid 41 or 42, the control action by control fluid flow line 1 is done by the pressure in port 51, while, when the pressure in fluid port 51 is lower-or no pressure-, then the action of control is done automatically by the high pressure in the high pressure delivery fluid line 41 or 42. While valve 52 is closed.

Figure 43:
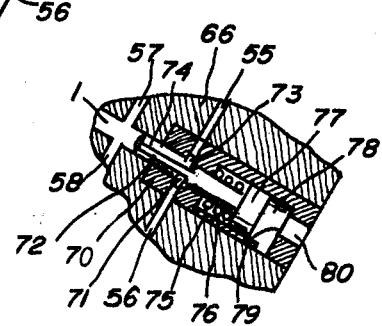
FIG. 43 is also a sectional view through a motor- or adupter-portion.

Instead of providing valve 52 of FIG. 42 it is also possible to set the valve assembly of housing portion 66 of FIG. 43 into the housing portion or adupter 50 of FIG. 42.

Valve housing 70 contains a chamber 78 with a control-piston 77 reciprocable mounted therein. The spring 57 drives the piston 77 towards the bottom of chamber 78 and thereby opens the communication of passages 55 and 56 to control fluid line 1. At same action the end of piston 77 closes the port 80 by acting as a closing valve on valve seat 79. The automatic control of the control action by the pressure in fluid in delivery line 41 or 42 is now acting. As soon however, as a remote controlled control-action is desired, a fluid under higher pressure than the pressure in the delivery main fluid line 41 or 42 is, is led to port 80. Thereby control piston 77 is pressed against the spring 75, compresses spring 75 and closes with piston-portion 72 the communication of passages 55 and 56 to the control fluid line 1. When the control-piston 77 under the pressure in fluid line 80 has reached the maximum spring-compressed position, fluid passes from the over-riding remote control fluid line 80 through the open valve seat 79 into chamber 78 and from there through passage 76 into passages 55 and 56 to close pistons 61 and 62 for closing passages 63 and 64 from passages 57 and 58. In this position control recess 71 communicates with control recess 73 of piston portion 72 and opens thereby the passage 74 to control-flow fluid line 1. The control of the controlling action is now done exclusively by the pressure in remote control flow 80, while the passages of the main operation fluid lines 41 and 42 to the respective fluid motor are cut off and closed.

The possibility of the arrangement of the invention, to either have an automatic control of a to be controlled adjustable member by the pressure in the main fluid flow delivery line, or to have the possibility to disconnect said main delivery flow from the control and utilize a different pressure-range for an over-riding control adds new possibilities to the operation of machines and vehicle, especially to aircraft, helicopters and gyrocopters as well as to propeller-blade control of other vehicles.

I claim:

1. An air-borne craft which includes at least one propeller which is driven by a hydrostatic fluid motor and wherein said fluid motor receives a hydrostatic pressure fluid supplied by a hydraulic fluid flow supply means through respective fluid lines to said fluid motor, and which further includes in said hydrostatic fluid motor a housing, revolvably mounting a rotor, containing working chambers for the reception of pressurized fluid and displacement means for the transfer of force of fluid to a portion of the rotor and to revolve the rotor and a control body associated to the rotor and to the housing to control the flow of fluid into and out of the working chambers, wherein a passage body extends from a portion of said housing into a centric bore of said rotor independently of said control body;

wherein said passage body includes two ports, two control fluid passages and two control ports;

wherein said passage body is substantially stationary relatively to said rotor, and has a fitting portion interrupted by said control ports;

wherein an axially moveable piston is provided on said rotor and said rotor includes a seal portion of a configuration complementary to said fitting portion and able to seal therealong;

wherein said piston includes passages periodically aligning by an alternation with one of said control ports at one time of said alternation and with the other of said control ports at an other time of said alternation;

wherein said rotor carries a fluid pressure housing which includes a pair of pressure chambers with springs and said piston therein while said passages alternatingly communicate one of said pressure chambers with one of said control ports; and, wherein said piston seals between said pressure chambers, is axially moveable in said pressure chambers and is having a connection member which extends through one of said pressure chambers and out of said one of said pressure chambers through one end of said one of said pressure chambers whereby it is sealingly fitted in said one end of said one of said pressure chambers.

2. The craft of claim 1, wherein one of said ports, fluid passages and control ports of said passage body is provided with a higher pressure than the others of said ports, fluid passages and control ports of said passage body.

3. The craft of claim 2, wherein said rotor provides an holder which includes a pair of diametrically located hollow bearing portions which extend along axes which are substantially normal to the axis of said rotor;

wherein said hollow bearing portions carry and hold pivotable members therein, and, wherein a transmission means is extended from said connection member to said pivotable members to pivot said pivotable members in response to the respective movement of said axially moveable piston in said pressure chambers in said fluid pressure housing.

4. The craft of claim 3, wherein said pivotable members are propellers and said transmission means is connected to said propellers, whereby the angles of attack of said propellers are decreased and increased during each revolution of said rotor in response to said movement of said axially moveable piston in said fluid pressure housing when said passages alternatingly align with said control ports of said passage body during said revolution of said rotor, whereby said angles of attack of said propellers are decreasing temporally in forward swings at forward flight of said craft while said angles of attack of said propellers are increasing temporally in backward swings at forward flight of said craft.

5. The craft of claim 4, wherein said higher pressure in said one of said ports, fluid passages and control ports of said passage body is variable and controllable, whereby the rate of said decreasing and increasing of said angle of attack of said propellers is adjustable to the respective speed of forward flight of said craft.

* * * * *